(12) United States Patent
Kanazawa et al.

(10) Patent No.: US 12,084,841 B2
(45) Date of Patent: Sep. 10, 2024

(54) CONSTRUCTION MANAGEMENT SYSTEM AND WORK MACHINE

(71) Applicant: HITACHI CONSTRUCTION MACHINERY CO., LTD., Tokyo (JP)

(72) Inventors: Akira Kanazawa, Tokyo (JP); Hiroyuki Yamada, Tokyo (JP); Shiho Izumi, Tsuchiura (JP); Shinya Imura, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 215 days.

(21) Appl. No.: 17/635,733

(22) PCT Filed: Aug. 20, 2020

(86) PCT No.: PCT/JP2020/031520
§ 371 (c)(1),
(2) Date: Feb. 16, 2022

(87) PCT Pub. No.: WO2021/059810
PCT Pub. Date: Apr. 1, 2021

(65) Prior Publication Data
US 2022/0307232 A1  Sep. 29, 2022

(30) Foreign Application Priority Data
Sep. 26, 2019 (JP) .................. 2019-175782

(51) Int. Cl.
*E02F 9/00* (2006.01)
*E02F 3/43* (2006.01)
(Continued)

(52) U.S. Cl.
CPC .............. *E02F 9/261* (2013.01); *E02F 3/435* (2013.01); *E02F 9/24* (2013.01)

(58) Field of Classification Search
CPC .............. E02F 9/261; E02F 3/435; E02F 9/24
(Continued)

(56) References Cited

U.S. PATENT DOCUMENTS

2021/0363732 A1   11/2021   Skillsater et al.

FOREIGN PATENT DOCUMENTS

| JP | 2008-097592 A | 4/2008 |
| JP | 2010-117882 A | 5/2010 |

(Continued)

OTHER PUBLICATIONS

International Search Report of PCT/JP2020/031520 dated Nov. 17, 2020.
(Continued)

*Primary Examiner* — Tiffany P Young
(74) *Attorney, Agent, or Firm* — MATTINGLY & MALUR, PC

(57) ABSTRACT

A construction management device computes a risk indicative of a degree of danger with which an accident occurs on the basis of information relating at least to a position of a worker measured by a worker position measuring device and a worker biometrical information measuring device, information relating at least to a position of a hydraulic excavator measured by a machine body position measuring device, a machine body posture measuring device, a machine front implement posture measuring device, and a machine operator biometrical information measuring device, personal information on a worker and an operator registered in a worker information registration device, and information on a construction environment from an environment information registration device, and outputs the computed risk as a coordinate risk associated with coordinates of the construction environment to a risk display device such that the computed risk is displayed in a map format on the risk display device.

8 Claims, 43 Drawing Sheets

(51) Int. Cl.
*E02F 9/24* (2006.01)
*E02F 9/26* (2006.01)

(58) Field of Classification Search
USPC .......................................................... 701/50
See application file for complete search history.

(56) References Cited

FOREIGN PATENT DOCUMENTS

| | | | |
|---|---|---|---|
| JP | 2017146735 A | * | 8/2017 |
| WO | 2019-210931 A1 | | 11/2019 |

OTHER PUBLICATIONS

International Preliminary Report on Patentability received in corresponding International Application No. PCT/JP2020/031520 dated Apr. 7, 2022.
Chinese Office Action received in corresponding Chinese Application No. 202080060918.9 dated Jun. 29, 2024.
Yan, Wenjie et al., "Application of Integrated BIM and RFID Technology in Safety Management of Water Conservancy Construction", Water Resources and Power, May 22, 2018, pp. 117-121, vol. 36, No. 5.
Xili, Yang, et al., "Research on risk management evaluation model of high-rise construction", Sichuan Building Materials, Feb. 1, 2010, pp. 250-251, vol. 36, No. 153.

* cited by examiner

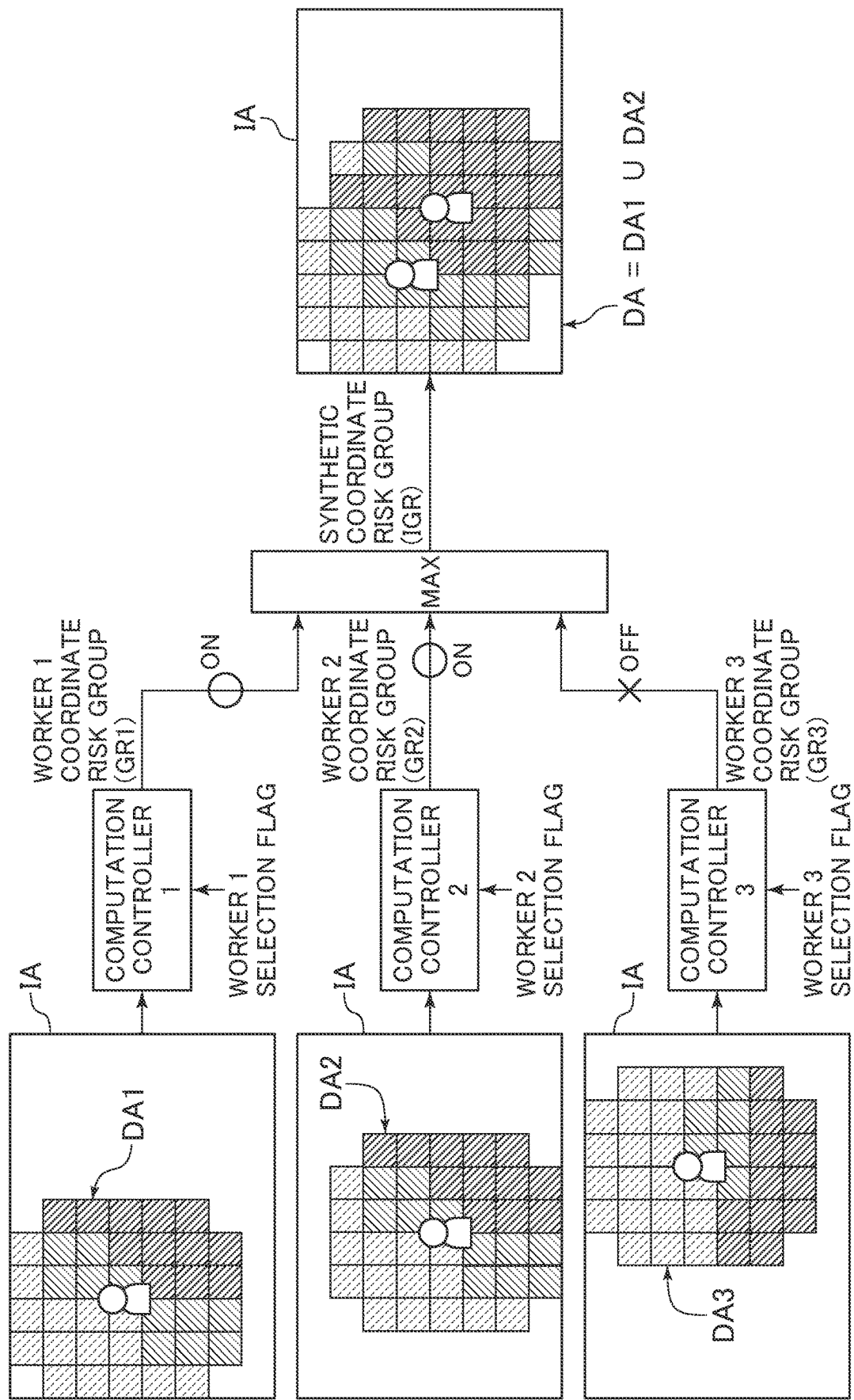

CONSTRUCTION MANAGEMENT SYSTEM AND WORK MACHINE

TECHNICAL FIELD

The present invention relates to a construction management system and a work machine.

BACKGROUND ART

Practical realization of a system for utilizing the ICT (Information and Communication Technology) to enhance the productivity in a construction site is advancing by promotion of i-Construction published by the Ministry of Land, Infrastructure, Transport and Tourism. Further, investigation is proceeding also in regard to activities for enhancement of the safety together with enhancement of the productivity, and a system that contributes to enhancement of the safety especially in an environment in which workers and machines exist in a mixed manner is demanded. As a system aimed at enhancement of the safety, a system begins to be commercialized in which position information obtained from sensors attached to a worker and a machine is summarized into a management server, and approach of the machine in a direction toward the worker or invasion of the machine into a dangerous area are monitored, warned, and displayed to achieve the safety of the worker. By introduction of such a system as just described, it is possible for a manager at the construction site to easily and simply grasp a dangerous event occurring in the construction site on the real time basis. On the other hand, in many conventional systems, a dangerous event is decided only from geometrical information such as positions and velocities of a worker and a machine, and in such a working situation that the distance between a worker and a machine is short, it is difficult for such conventional systems to accurately evaluate the degree of danger (hereinafter referred to as risk) with which an accident occurs.

Therefore, as a technology for evaluating and presenting a risk taking information other than geometrical information such as position information into consideration, a construction management system that includes a storage device and a computation device and provides management information for construction management of a target construction is disclosed, for example, in Patent Document 1. In the construction management system, the storage device includes a work content information storage section for storing work information relating to contents of a plurality of works in the target construction, and the computation device includes a risk evaluation section for evaluating a risk degree relating to each of the plurality of works on the basis of the work information stored in the work content information storage section.

PRIOR ART DOCUMENT

Patent Document

Patent Document 1: JP-2017-146735-A

SUMMARY OF THE INVENTION

Problem to be Solved by the Invention

One of accidents that may occur in a construction site is, for example, a minor collision between a person and a machine. As a factor of a minor collision between a person and a machine, it is considered first that the cause exists on the machine side that is a side providing a risk. This is, for example, a case in which an operator of the machine operates roughly or another case in which working is performed outside a work area supposed in advance. On the other hand, also it is considered that the cause exists on the side of a person that is a side suffering a risk. This is, for example, a case in which a worker who is not involved in a work schedule approaches the machine carelessly, another case in which a worker misunderstands the movable range of the machine and approaches the machine during operation of the machine, or a like case. Accordingly, in order to evaluate a minor collision risk with a high degree of accuracy, it is necessary to take into consideration the states of both the side that provides a risk and the side that suffers the risk.

However, in the conventional technology described above, although a risk is evaluated taking a state of a worker (driver) into consideration in addition to position information, an interaction between risk factors arising from states on the side that provides a risk and the side that suffers the risk is not taken into consideration. In particular, since it is supposed that, in a construction site, a plurality of workers and a plurality of machines are in states different from each other, a risk of a dangerous event such a minor collision that arises from behaviors of two individuals cannot be evaluated correctly, and it is difficult to present an evaluation result in an appropriate form to a manager.

The present invention has been made in view of such a situation as described above, and it is an object of the present invention to provide a construction management system and a working machine that can evaluate a risk in a construction site with a higher degree of accuracy and can present an evaluation result in a more appropriate form.

Means for Solving the Problem

Although the present application includes a plurality of means for solving the problem described above, as an example, there is provided a construction management system including a worker measuring device for measuring a state of a worker, a machine measuring device for measuring a state of a work machine, a worker information registration device that registers personal information on the worker and an operator who operates the work machine, an environment information registration device that registers information on a construction environment to be made a target, and a construction management device that is configured to compute, on the basis of information relating at least to a position of the worker measured by the worker measuring device, information relating at least to a position of the work machine measured by the machine measuring device, personal information on the worker and the operator, the personal information being registered in the worker information registration device, and information on the construction environment from the environment information registration device, a risk that indicates a degree of danger with which an accident occurs, and outputs the computed risk as a coordinate risk associated with a coordinate of the construction environment to a risk display device such that the risk is displayed in a map format on the risk display device.

Advantages of the Invention

With the present invention, a risk in a construction site can be evaluated with a higher degree of accuracy and an evaluation result can be presented in a more appropriate form.

BRIEF DESCRIPTION OF THE DRAWINGS

FIG. 50 is a view depicting processing functions of a risk synthesis section according to the fifth embodiment.

MODES FOR CARRYING OUT THE INVENTION

In the following, embodiments of the present invention are described with reference to the drawings. It is to be noted that, although the embodiments are described exemplifying a hydraulic excavator as an example of a work machine, also it is possible to apply the present invention to other work machines used at work sites.

First Embodiment

A first embodiment of the present invention is described with reference to FIGS. 1 to 34.

In the present embodiment, the degree of danger (hereinafter referred to as risk) of an accident in such an environment as at a construction site at which a worker (person) and a machine (work machine) exist in a mixed state is computed, and a result of the computation is presented to a construction manager or the like by displaying it in a map format on a risk display device. On the risk display device, a risk in an area determined in advance that includes a work machine (in the present embodiment, a hydraulic excavators) operating at the construction site is displayed. It is to be noted that the present embodiment is described exemplifying a case in which the number of persons on the side that suffers a risk is one and the number of work machines (hydraulic excavators) on the side that provides a risk is one.

Figure 1:
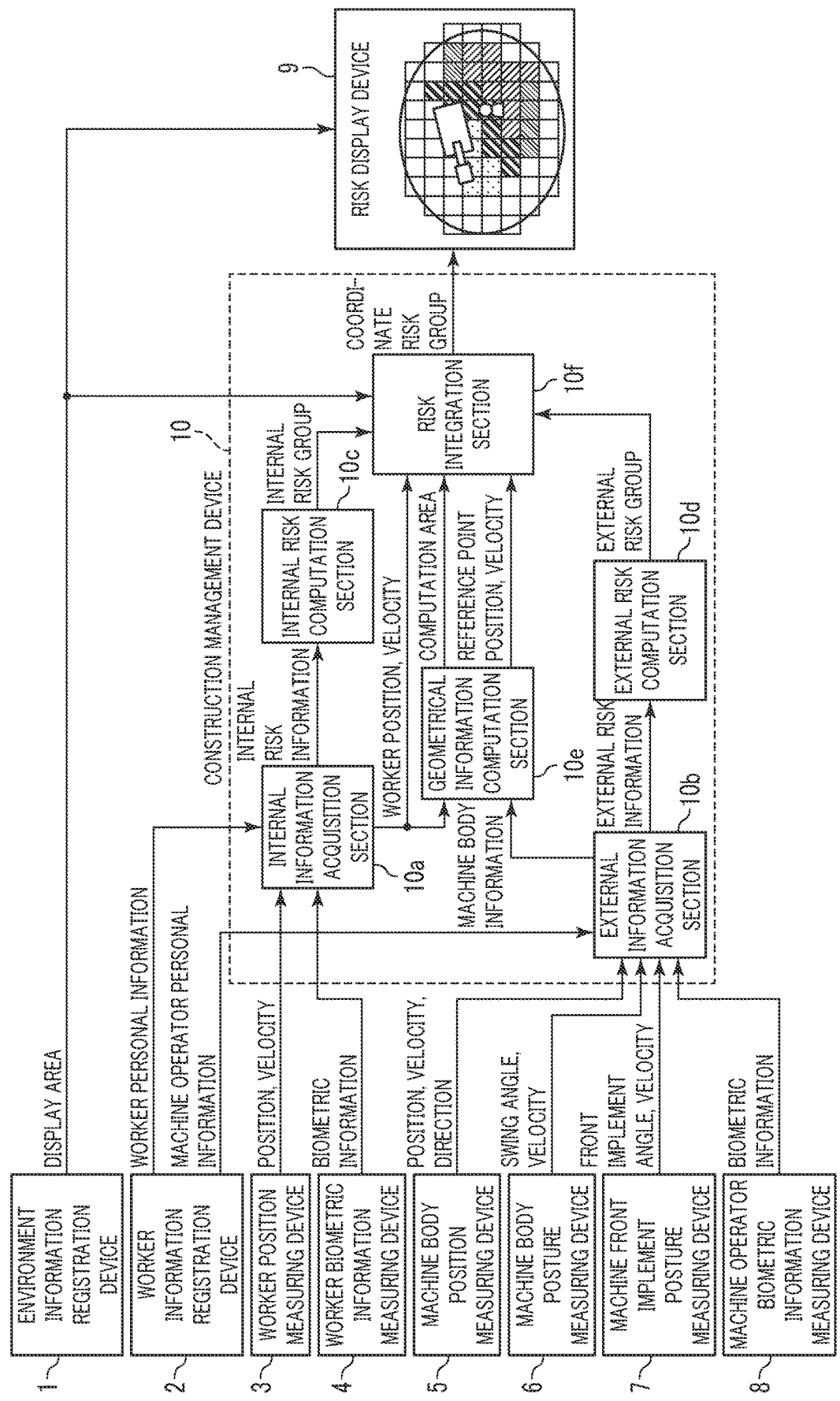
FIG. 1 is a functional block diagram depicting processing functions of a construction management system according to a first embodiment.
Figure 2:
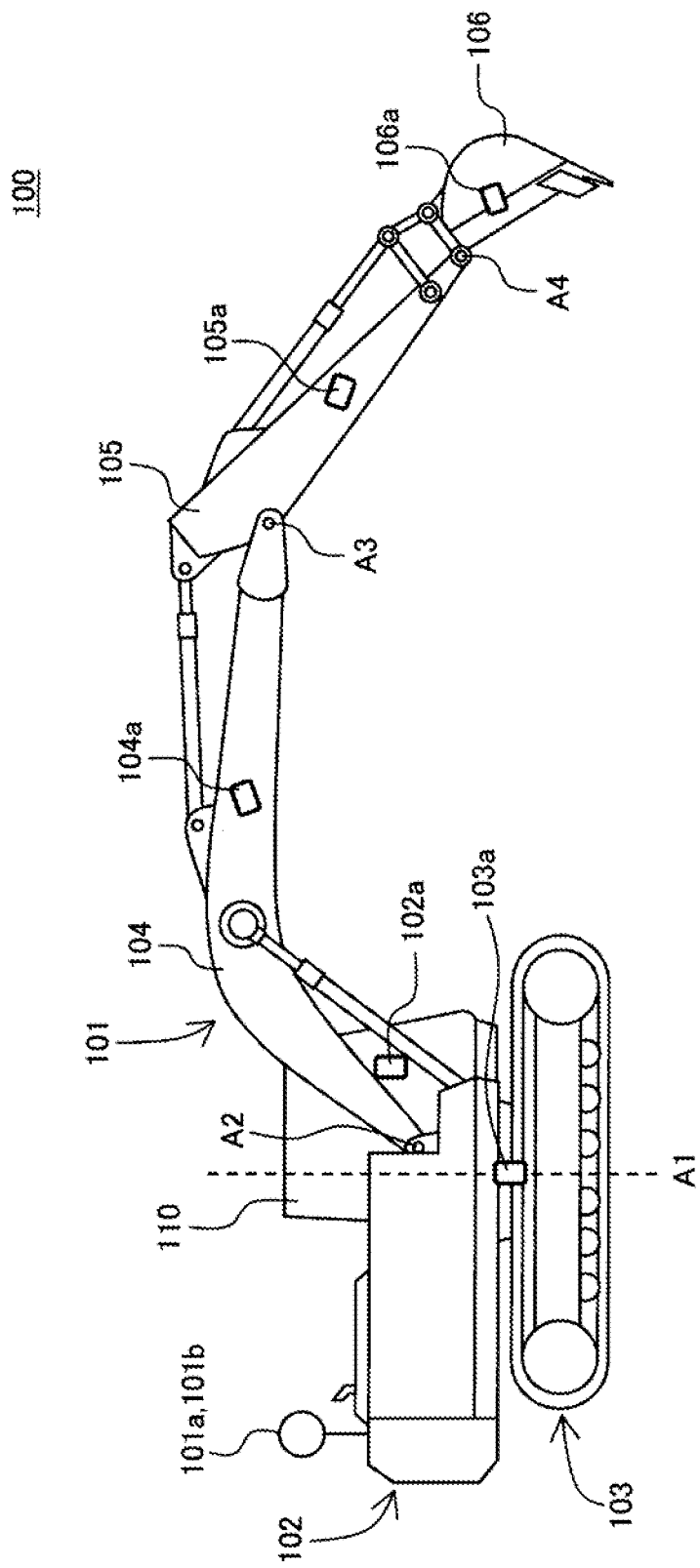
FIG. 2 is a view schematically depicting an appearance of a hydraulic excavator as an example of a work machine.

FIG. 1 is a functional block diagram depicting processing functions of a construction management system according to the present embodiment. Meanwhile, FIG. 2 is a view schematically depicting an appearance of a hydraulic excavator as an example of the work machine according to the present embodiment.

Referring to FIG. 1, the construction management system includes an environment information registration device 1, a worker information registration device 2, a worker position measuring device 3, a worker biometric information measuring device 4, a machine body position measuring device 5, a machine body posture measuring device 6, a machine front implement posture measuring device 7, a machine operator biometric information measuring device 8, a risk display device 9, and a construction management device 10.

The environment information registration device 1 has registered therein in advance a display area (IA) that defines an area of a risk to be displayed on the risk display device 9. As the display area (IA), for example, the entire construction site may be set or otherwise a range that includes a hydraulic excavator 100 and a worker existing within a fixed distance from the hydraulic excavator 100 (range that requires evaluation of a risk) may be set.

In the worker information registration device 2, personal information on a worker who works at the construction site and an operator of the hydraulic excavator 100 are registered in advance by the worker or the operator itself or else by a construction manager. In the worker information registration device 2, as the personal information on the worker (worker personal information) and the personal information on the operator (machine operator personal information), work experiences, a work schedule on the day or a physical condition on the day, and so forth of the worker or the operator are registered.

The worker position measuring device 3 measures position information on the worker and is, for example, an RFID tag, a GPS terminal, or the like mounted on or carried by the worker. The worker position measuring device 3 transmits position information measured by a communication function thereof, not depicted, to the outside. Further, the worker position measuring device 3 numerically differentiates the acquired position information to compute a velocity of the worker and transmits the computed velocity. It is to be noted that the worker position measuring device 3 may be a camera, a laser sensor, or the like installed in a construction environment or on the work machine, or such a configuration may be adopted that the position of the worker is measured externally by such devices as described above.

The worker biometric information measuring device 4 is, for example, a wearable terminal that is worn directly by the worker, and measures biometric information on the worker such as the heartbeat, electrocardiograph, or body temperature and transmits the measured biometric information to the outside by a communication function thereof, not depicted. It is to be noted that the worker biometric information measuring device 4 may be a camera, a laser sensor, or the like installed in the construction environment or on the work machine, or such a configuration may be adopted that the state (biometric information) of the worker is externally measured by such devices.

As depicted in FIG. 2, the hydraulic excavator 100 that is the work machine according to the present embodiment includes a front work implement 101 of the articulated type configured from a plurality of pivotally movable driven members (a boom 104, an arm 105, and a bucket (work tool) 106) connected to each other, and an upper swing structure 102 and a lower track structure 103 that configures the machine body. The upper swing structure 102 is swingably provided with respect to the lower track structure 103. The boom 104 of the front work implement 101 is pivotably supported at the proximal end thereof at a front portion of the upper swing structure 102, and the arm 105 is pivotably supported at one end thereof at an end portion (distal end) different from the proximal end of the boom 104 while the bucket 106 is pivotably supported at the other end of the arm 105. The driven members of the front work implement 101 are individually driven to be pivoted by hydraulic cylinders, and the upper swing structure 102 is driven to be swung with respect to the lower track structure 103 by a hydraulic motor. Further, an operation room 110 in which the operator of the hydraulic excavator 100 is to board is provided on the upper swing structure 102.

The machine body position measuring device 5 measures information on the position, direction (orientation of the upper swing structure 102), velocity of movement, and so forth of the hydraulic excavator 100 on a global coordinate system, and is configured, for example, from two reception antennae for GNSS (Global Navigation Satellite System) (GNSS antennae) 101a and 101b attached to an upper portion of the upper swing structure 102 and a computation device not depicted. The GNSS is a satellite positioning system that receives positioning signals from a plurality of positioning satellites to find out an own position on the earth. The GNSS antennae 101a and 101b receive positioning signals from a plurality of positioning satellites positioned above the earth, and the position of the GNSS antennae 101a and 101b on the global coordinate system can be acquired through computation performed by the computation device on the basis of the acquired positioning signals. Since the installation position of the GNSS antennae 101a and 101b with respect to the hydraulic excavator 100 is known in advance, the position and the orientation (direction) of the hydraulic excavator 100 at the construction site can be acquired as position information by the acquisition of the position of the GNSS antennae 101a and 101b on the global coordinate system. Further, the machine body position measuring device 5 numerically differentiates the acquired position information to compute the velocity of the hydraulic excavator 100 and transmits the velocity of the hydraulic excavator 100.

The machine body posture measuring device 6 measures the swing velocity and the swing angle of the upper swing structure 102 with respect to the lower track structure 103 and includes, for example, an inertial measurement unit (IMU) 102a provided on the upper swing structure 102 and an angle measurement unit 103a provided on a swing portion of the upper swing structure 102 with respect to the lower track structure 103. The inertial measurement unit 102a measures the angular velocity and acceleration, and a swing velocity of the upper swing structure 102 around the pivotal axis A1 is calculated by a computation device not depicted. Meanwhile, the angle measurement unit 103a computes the swing angle of the upper swing structure 102 around the pivotal axis A1.

The machine front implement posture measuring device 7 measures the pivotal angle and the pivoting velocity of each of the driven members 104 to 106 of the front work implement 101, and includes, for example, an inertia measurement unit (IMU) 104a attached to the boom 104 of the hydraulic excavator 100, an inertia measurement unit (IMU) 105a attached to the arm 105, and an inertia measurement unit (IMU) 106a attached to the bucket 106. Each of the inertial measurement units 104a to 106a measures an acceleration and an angular velocity, and an angle and an angular velocity of the boom 104 around the pivot axis A2, an angle and an angular velocity of the arm 105 around the pivot axis A3, and an angle and an angular velocity of the bucket 106 around the pivot axis A4 are computed by the computation device not depicted. It is to be noted that such a configuration may be applied alternatively that angle sensors are installed in the proximity of the pivot axes A1 to A3 of the boom 104, arm 105, and bucket 106, respectively, such that the pivotal angles of them are measured directly.

The machine operator biometric information measuring device 8 is a wearable terminal that is worn directly by the operator in the operation room 110 and measures and transmits the heartbeat, electrocardiograph, body temperature, and so forth of the operator. It is to be noted that the machine operator biometric information measuring device 8 may be a camera, a laser sensor, or the like installed in the operation room 110, or the machine operator biometric information measuring device 8 may be configured such that the state (biometric information) of the operator is externally measured by such devices.

The risk display device 9 is provide in a construction management company, a management office at the construction site, or the like and presents risks displayed in a map format to the construction manager or the like. The construction manager can appropriately manage a risk at the construction site by confirming the risks displayed on the risk display device 9.

The construction management device 10 includes an internal information acquisition section 10a, an external information acquisition section 10b, an internal risk computation section 10c, an external risk computation section 10d, a geometrical information computation section 10e, and a risk integration section 10f.

The internal information acquisition section 10a acquires and summarizes information obtained by measurement of various states of the side that suffers a risk (i.e., the worker). In particular, the internal information acquisition section 10a acquires worker personal information registered in the worker information registration device 2, information on the position and the velocity of the worker measured by the worker position measuring device 3, and biometric information on the worker measured by the worker biometric information measuring device 4 and then summarizes and outputs them as internal risk information unique to the worker to the internal risk computation section 10c. Further, the internal information acquisition section 10a outputs the information on the position and the velocity of the worker to the geometrical information computation section 10e and the risk integration section 10f.

The external information acquisition section 10b acquires and summarizes information obtained by measurement of various states of the side that provides a risk (i.e., the hydraulic excavator 100 that is the work machine). In particular, the external information acquisition section 10b acquires machine operator personal information registered in the worker information registration device 2, information on the position, the velocity, and the direction (orientation) of the hydraulic excavator 100 measured by the machine body position measuring device 5, information on the swing velocity and the angular velocity of the upper swing structure 102 measured by the machine body posture measuring device 6, information on the angle and the angular velocity of each of the driven members 104 to 106 of the front work implement 101 measured by the machine front implement posture measuring device 7, and biometric information on the operator measured by the machine operator biometric information measuring device 8, and summarizes and outputs the acquired information as external risk information unique to the work machine to the external risk computation section 10d. Further, the external information acquisition section 10b outputs machine body information (information on the position and the velocity) of the hydraulic excavator 100 to the geometrical information computation section 10e.

Figure 3:
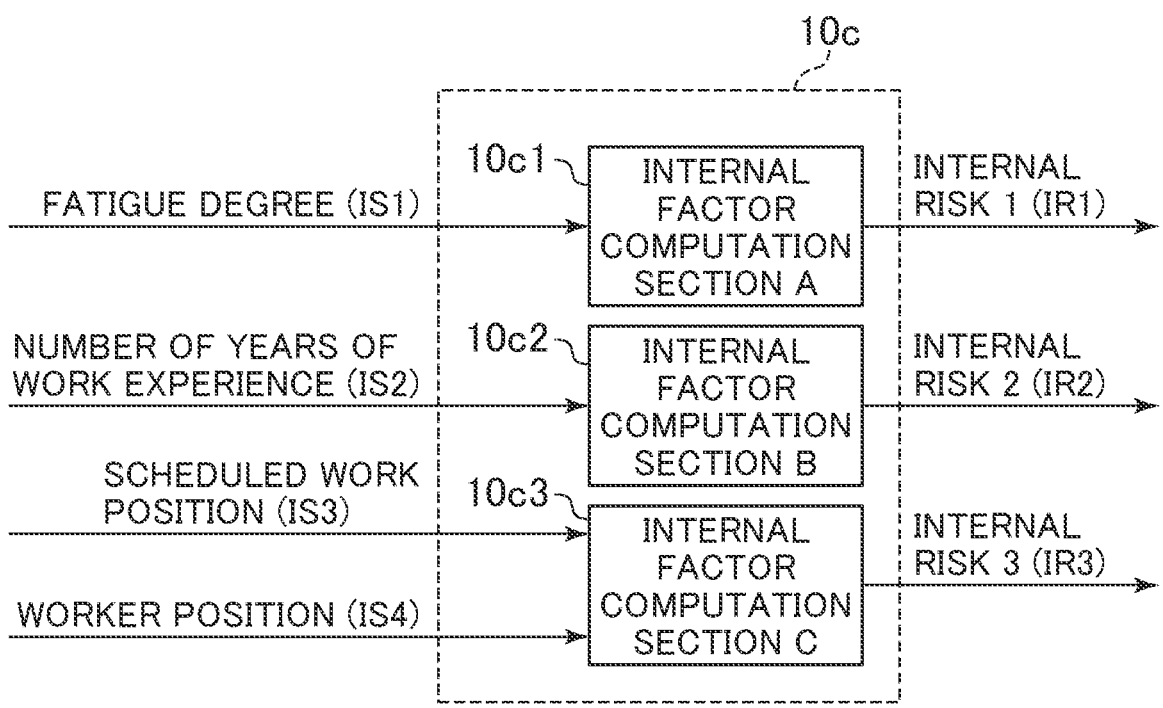
FIG. 3 is a functional block diagram depicting processing functions of an internal risk computation section.

FIG. 3 is a functional block diagram depicting processing functions of the internal risk computation section.

Referring to FIG. 3, the internal risk computation section 10c includes, as functioning sections for computing an internal factor, for example, an internal factor computation section A 10c1, an internal factor computation section B 10c2, and an internal factor computation section C 10c3. The internal risk computation section 10c computes internal risks (IR1 to IR3) on the basis of internal risk information (IS1 to IS4) and outputs them to the risk integration section 10f.

The internal factor computation section A 10c1 computes the internal risk 1 (IR1) on the basis of the (expression 1) given below, for example, from a fatigue degree (IS1) of the worker, which is one of pieces of internal risk information.

[Expression 1]

$$IR1 = c_{I1} e^{-\lambda_{I1}(1/IS1)} \qquad \text{(expression 1)}$$

Here, in the (expression 1) above, CI1 is a coefficient that defines a maximum value of an internal risk (IR1) and is equal to or higher than 0 (zero) and equal to or lower than 1, and $\lambda I1$ is a coefficient for adjusting the degree of increase or decrease in the internal risk 1 (IR1) in response to increase or decrease in the fatigue degree (IS1). Further, the fatigue degree (IS1) is a scalar value that indicates a fatigue degree of the worker estimated from the heartbeat, electrocardiograph, and body temperature information on the worker and is equal to or higher than 0 (zero).

Figure 4:
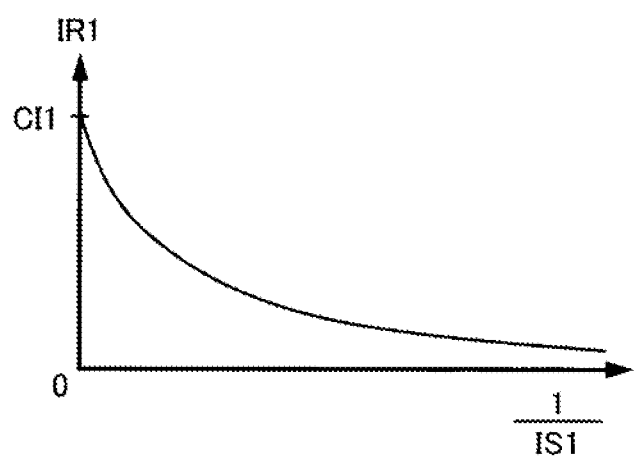
FIG. 4 is a view depicting a graph of risk computation in accordance with an (expression 1).

FIG. 4 is a graph of the risk computation in accordance with the (expression 1) above. As depicted in FIG. 4, the internal risk 1 (IR1) approaches its maximum value 1 as the fatigue degree (IS1) increases and approaches its minimum value 0 (zero) as the fatigue degree (IS1) decreases.

The internal factor computation section B 10c2 computes the internal risk 2 (IR2) on the basis of the expression (2) given below, for example, from the number of years of work experience (IS2) of the worker, which is one of pieces of the internal risk information.

[Expression 2]

$$IR2 = c_{I2} e^{-\lambda_{I2}(1/IS2)} \qquad \text{(expression 2)}$$

Here, in the (expression 2) above, CI2 is a coefficient that defines a maximum value of the internal risk 2 (IR2) and is equal to or higher than 0 (zero) and equal to or lower than 1, and $\lambda I2$ is a coefficient for adjusting the degree of increase or decrease in the internal risk 2 (IR2) in response to increase or decrease in the number of years of experience (IS2). Further, the number of years of work experience (IS2) is a scalar value that indicates the number of years of experience of the worker and is equal to or higher than 0 (zero).

Figure 5:
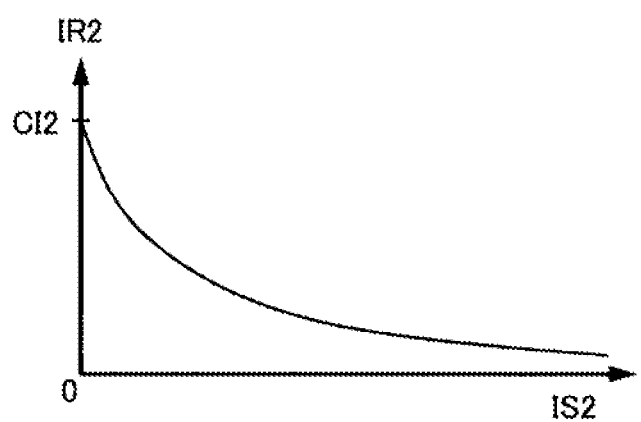
FIG. 5 is a view depicting a graph of risk computation in accordance with an (expression 2).

FIG. 5 is a graph of the risk computation in accordance with the (expression 2) above. As depicted in FIG. 5, the internal risk 2 (IR2) approaches its maximum value 1 as the number of years of work experience (IS2) decreases and approaches its minimum value 0 (zero) as the number of years of work experience (IS2) increases.

The internal factor computation section C 10c3 computes the internal risk 3 (IR3) on the basis of the expression (3) given below, for example, from the scheduled work position (IS3), which is one of pieces of the internal risk information, and the worker position (IS4) of the worker.

[Expression 3]

$$IR3 = c_{I3} e^{-\lambda_{I3}(1/|IS3-IS4|)} \quad \text{(expression 3)}$$

Here, in the (expression 3) above, CI3 is a coefficient that defines a maximum value of the internal risk 3 (IR3) and is equal to or higher than 0 (zero) and equal to or lower than 1, and λI3 is a coefficient for adjusting the degree of increase or decrease in the internal risk 3 (IR3) in response to increase or decrease in the reciprocal of the absolute value of the difference between the scheduled work position (IS3) and the worker position (IS4). Further, the scheduled work position (IS3) and the worker position (IS4) are vectors indicative of two-dimensional positions in the horizontal direction.

Figure 6:
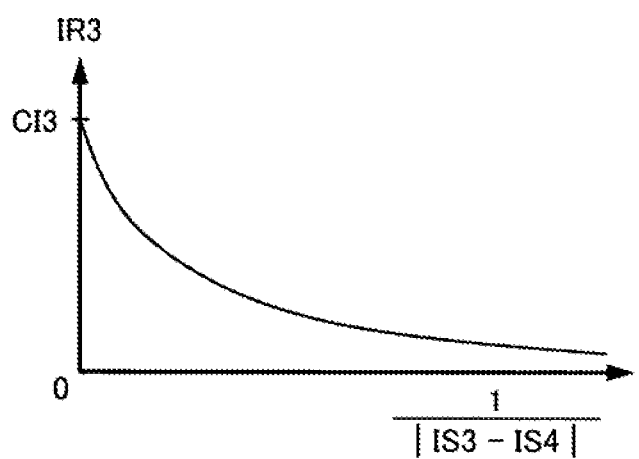
FIG. 6 is a view depicting a graph of risk computation in accordance with an (expression 3).

FIG. 6 is a graph of the risk computation in accordance with the (expression 3) above. As depicted in FIG. 6, the internal risk 3 (IR3) approaches its maximum value 1 as the absolute value of the difference between the scheduled work position (IS3) and the worker position (IS4) increases and approaches its minimum value 0 (zero) as the absolute value of the difference between the scheduled work position (IS3) and the worker position (IS4) decreases.

Figure 7:
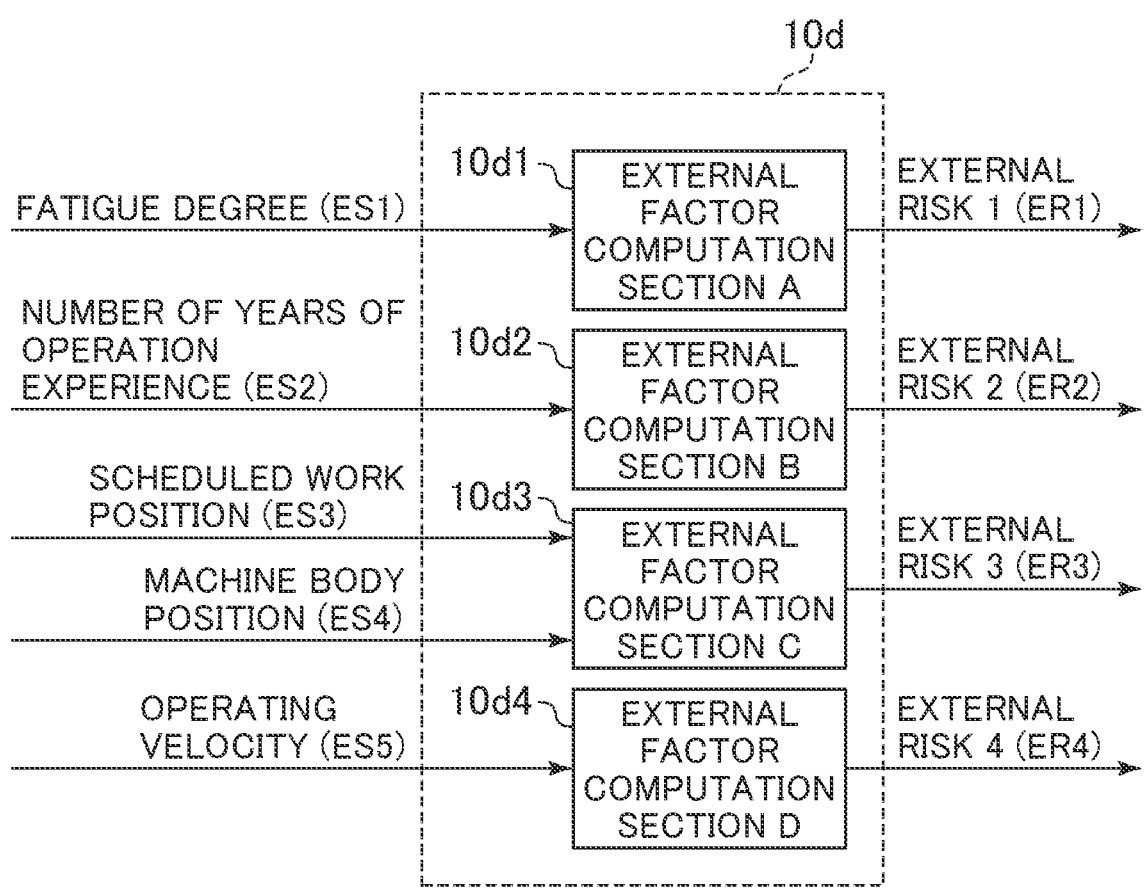
FIG. 7 is a functional block diagram depicting processing functions of an external risk computation section.

FIG. 7 is a functional block diagram depicting processing functions of the external risk computation section.

Referring to FIG. 7, the external risk computation section 10d includes, as functioning sections for computing an external factor, for example, an external factor computation section A 10d1, an external factor computation section B 10d2, an external factor computation section C 10d3, and an external factor computation section D 10d4. The external risk computation section 10d computes external risks (ER1 to IR4) on the basis of external risk information (ES1 to ES5) and outputs the computed external risks to the risk integration section 10f.

The external factor computation section A 10d1 computes the external risk 1 (ER1) on the basis of the expression (4) given below from the fatigue degree (ES1) of the machine operator, which is one of pieces of the external risk information.

[Expression 4]

$$ER1 = c_{E1} e^{-\lambda_{E1}(1/ES1)} \quad \text{(expression 4)}$$

Here, in the (expression 4) above, CE1 is a coefficient that defines a maximum value of the external risk 1 (ER1) and is equal to or higher than 0 (zero) and equal to or lower than 1, and λE1 is a coefficient for adjusting the degree of increase or decrease in the external risk 1 (ER1) in response to increase or decrease in the fatigue degree (ES1). Further, the fatigue degree (ES1) is a scalar value that indicates a fatigue degree of the machine operator estimated from the heartbeat, electrocardiograph, and body temperature information on the machine operator and is equal to or higher than 0 (zero).

Figure 8:
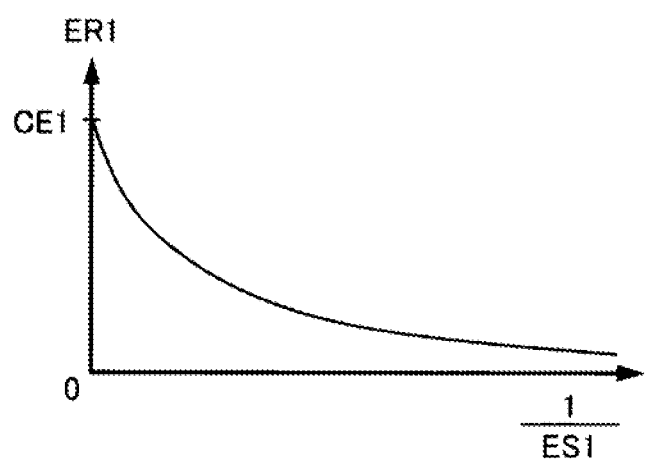
FIG. 8 is a view depicting a graph of risk computation in accordance with an (expression 4).

FIG. 8 is a graph of the risk computation in accordance with the (expression 4) above. As depicted in FIG. 8, the external risk 1 (ER1) approaches its maximum value 1 as the fatigue degree (ES1) increases and approaches its minimum value 0 (zero) as the fatigue degree (ES1) decreases.

The external factor computation section B 10d2 computes the external risk 2 (ER2) on the basis of the (expression 5) given below, for example, from the number of years of operation experience (ES2) of the machine operator, which is one of pieces of the external risk information.

[Expression 5]

$$ER2 = c_{E2} e^{-\lambda_{E2}(ES2)} \quad \text{(expression 5)}$$

Here, in the (expression 5) above, CE2 is a coefficient that defines a maximum value of the external risk 2 (ER2) and is equal to or higher than 0 (zero) and equal to or lower than 1, and λE2 is a coefficient for adjusting the degree of increase or decrease in the external risk 2 (ER2) in response to increase or decrease in the number of years of operation experience (ES2). Further, the number of years of operation experience (ES2) is a scalar value that indicates the number of years of experience of the machine operator and is equal to or higher than 0 (zero).

Figure 9:
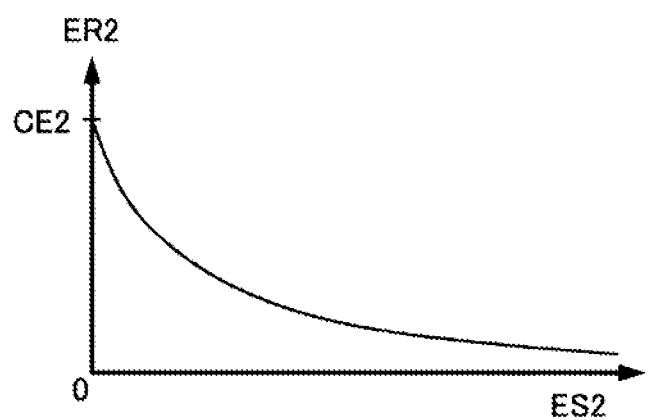
FIG. 9 is a view depicting a graph of risk computation in accordance with an (expression 5).

FIG. 9 is a graph of the risk computation in accordance with the (expression 5) above. As depicted in FIG. 9, the external risk 2 (ER2) approaches its maximum value 1 as the number of years of operation experience (ES2) decreases and approaches its minimum value 0 (zero) as the number of years of operation experience (ES2) increases.

The external factor computation section C 10d3 computes the external risk 3 (ER3) on the basis of the (expression 6) given below, for example, from the scheduled work position (ES3) of the machine, which is one of pieces of the external risk information, and the machine body position (ES4) of the work machine (hydraulic excavator 100).

[Expression 6]

$$ER3 = c_{E3} e^{-\lambda_{E3}(1/|ES3-ES4|)} \quad \text{(expression 6)}$$

Here, in the (expression 6) above, CE3 is a coefficient that defines a maximum value of the external risk 3 (ER3) and is equal to or higher than 0 (zero) and equal to or lower than 1, and λE3 is a coefficient for adjusting the degree of increase or decrease in the external risk 3 (ER3) in response to increase or decrease in the reciprocal of the absolute value of the difference between the scheduled work position (ES3) and the machine body position (ES4). Further, the scheduled work position (ES3) and the machine body position (ES4) are vectors indicative of two-dimensional positions in the horizontal direction.

Figure 10:
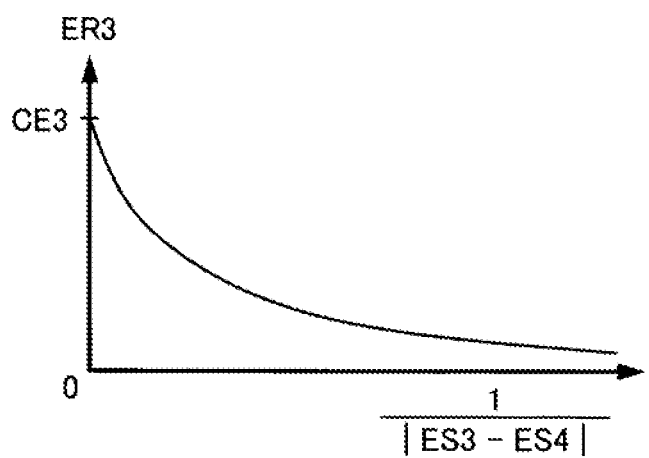
FIG. 10 is a view depicting a graph of risk computation in accordance with an (expression 6).

FIG. 10 is a graph of the risk computation in accordance with the (expression 6) above. As depicted in FIG. 10, the external risk 3 (ER3) approaches its maximum value 1 as the absolute value of the difference between the scheduled work position (ES3) and the machine body position (ES4) increases and approaches its minimum value 0 (zero) as the absolute value of the difference between the scheduled work position (ES3) and the machine body position (ES4) decreases.

The external factor computation section D 10d4 computes the external risk 4 (ER4) on the basis of the (expression 7) given below, for example, from the operating velocity (ES5) of the machine, which is one of pieces of the external risk information.

[Expression 7]

$$ER4 = c_{E4} e^{-\lambda_{E4}(1/|ES5|)} \quad \text{(expression 7)}$$

Here, in the (expression 7) above, CE4 is a coefficient that defines a maximum value of the external risk 4 (ER4) and is equal to or higher than 0 (zero) and equal to or lower than 1, and λE4 is a coefficient for adjusting the degree of increase or decrease in the external risk 4 (ER4) in response to increase or decrease in the reciprocal of the absolute value of the operating velocity (ES5). Further, the operating velocity (ES5) is a vector indicative of a two-dimensional velocity in the horizontal direction.

Figure 11:
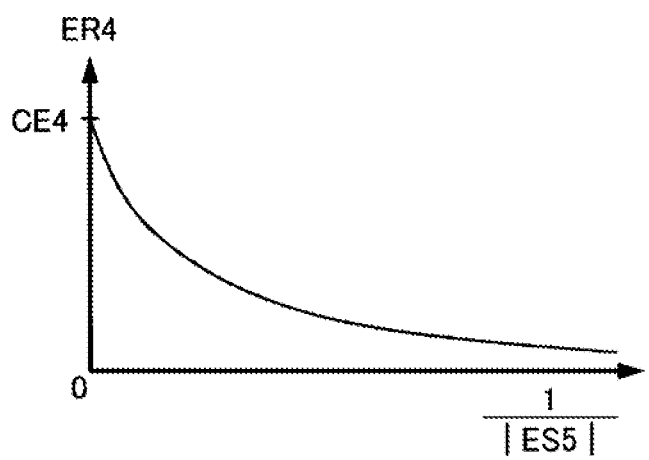
FIG. 11 is a view depicting a graph of risk computation in accordance with an (expression 7).

FIG. 11 is a graph of the risk computation in accordance with the (expression 7) above. As depicted in FIG. 11, the external risk 4 (ER4) approaches its maximum value 1 as the absolute value of the operating velocity (ES5) increases and approaches its minimum value 0 (zero) as the absolute value of the operating velocity (ES5) decreases.

Figure 12:
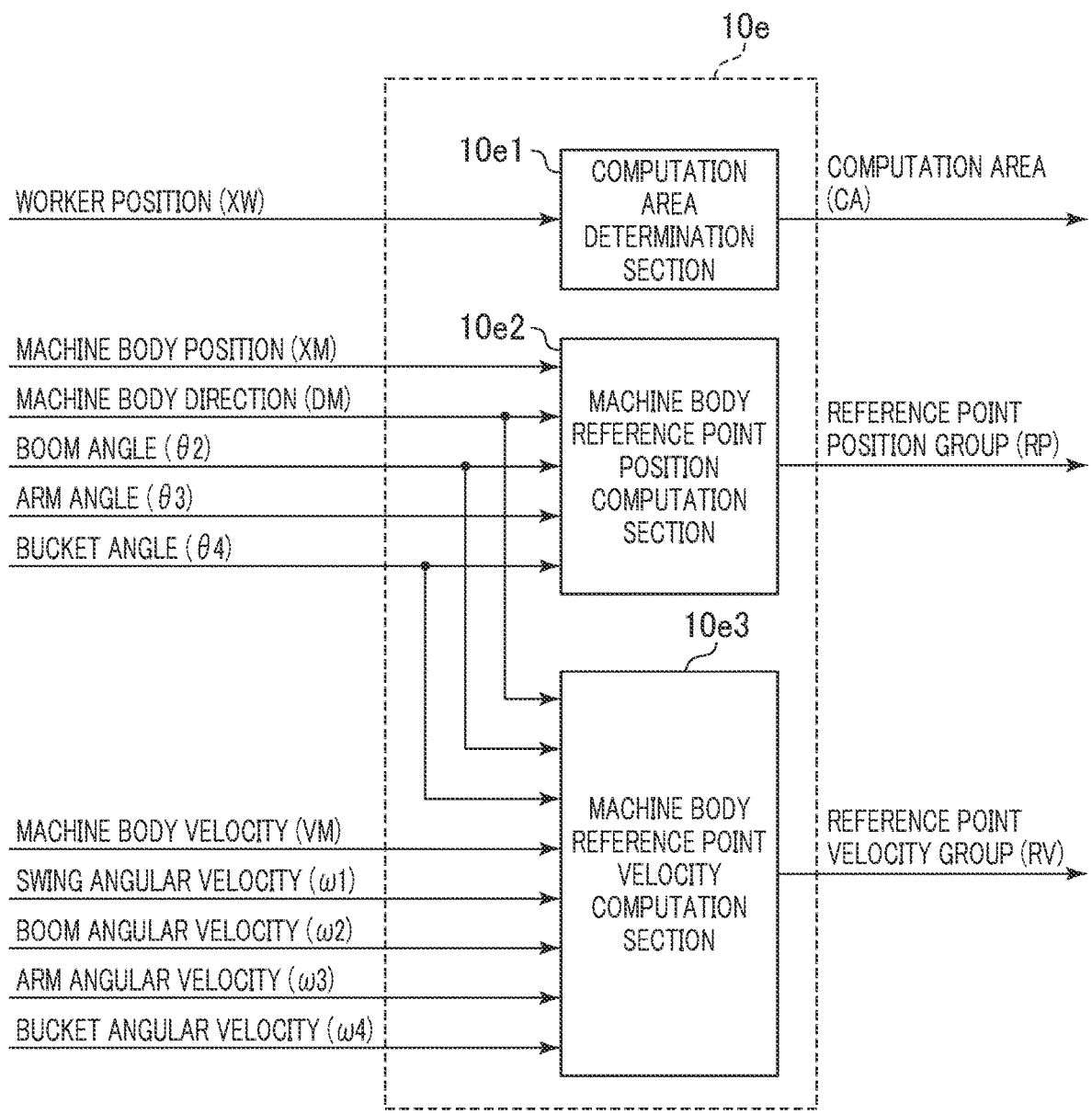
FIG. 12 is a functional block diagram depicting processing functions of a geometrical information computation section according to the first embodiment.

FIG. 12 is a functional block diagram depicting processing functions of the geometrical information computation section.

Referring to FIG. 12, the geometrical information computation section 10e includes, as functioning sections for computing geometrical information, a computation area computation section 10e1, a machine body reference point position computation section 10e2, and a machine body reference point velocity computation section 10e3. The geometrical information computation section 10e computes a computation area (CA), a reference point position group (RP), and a reference point velocity group (RV) on the basis of various information inputted thereto and outputs them to the risk integration section 10f.

Figure 13:
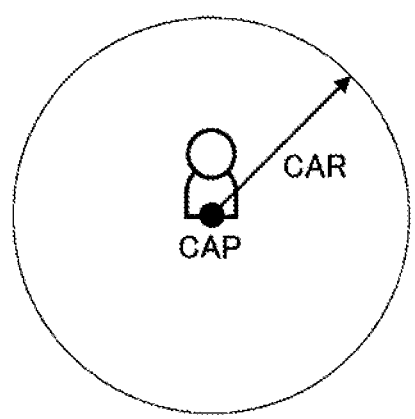
FIG. 13 is a view depicting a relation between a center position and a radius of a computation area circle.

The computation area computation section 10e1 computes a computation area (CA) for risks on the basis of a worker position (XW). As depicted in FIG. 13, the computation area (CA) is a two-dimensional vector configured, from two kinds of information on a center position (CAP) and a radius (CAR) of a computation area circle, so as to satisfy CA=(CAP, CAR). The center position (CAP) coincides with the worker position (XW). The radius (CAR) is set in advance before the risk computation process is started taking the dispersion of the measurement sensors and the computation cycle of the computation device into consideration.

Figure 14:
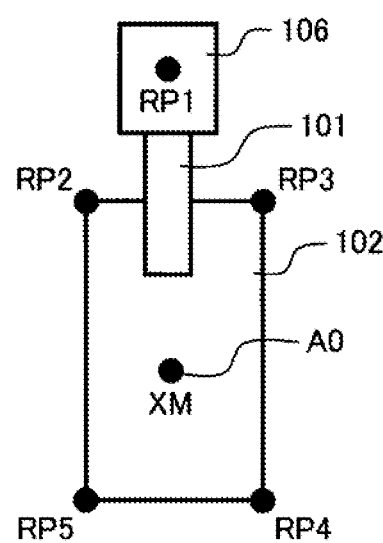
FIG. 14 is a view illustrating a definition of a reference point.

The machine body reference point position computation section 10e2 computes positions (RP) of a plurality of reference points defined in advance on the hydraulic excavator 100 (machine body) on the basis of a machine body position (XM), a machine body direction (DM), a boom angle (θ2), an arm angle (θ3), and a bucket angle (θ4). In the present embodiment, a reference point is defined at the center position of the bucket 106 provided on the front work implement 101 as depicted in FIG. 14. Similarly, a reference point is defined at each of four points of the four corners of the upper swing structure 102. The machine body reference point position computation section 10e2 calculates reference point positions (RP1) to (RP5) of the reference points and outputs them collectively as a reference point position group (RP) to the risk integration section 10f.

The reference point position (RP1) is calculated on the basis of the (expression 8) given below from a two dimensional machine body position (XM) in the horizontal direction, a machine body direction (DM) with respect to the vertical axis to the horizontal plane, the boom angle (θ2), the arm angle (θ3), and the bucket angle (θ4).

[Expression 8]

$$RP1 = XM + f_1(DM, \theta2, \theta3, \theta4) \quad \text{(expression 8)}$$

Here, in the expression (8) above, f1 is a function for calculating translational movement from the machine body position (XM) to the reference point (RP1) using the machine body direction (DM), boom angle (θ2), arm angle (θ3), and bucket angle (θ4) as variables. It is to be noted that the machine body position (XM) is defined so as to coincide with the position of the pivotal axis (A0) as viewed from above the machine body. Similarly, the reference point positions (RP2) to (RP5) are calculated on the basis of the (expression 9) to (expression 12) given below from the machine body position (XM) and the machine body direction (DM).

[Expression 9]

$$RP2 = XM + f_2(DM) \quad \text{(expression 9)}$$

[Expression 10]

$$RP3 = XM + f_3(DM) \quad \text{(expression 10)}$$

[Expression 11]

$$RP4 = XM + f_4(DM) \quad \text{(expression 11)}$$

[Expression 12]

$$RP5 = XM + f_5(DM) \quad \text{(expression 12)}$$

Here, in the (expression 9) to (expression 12) above, f2 is a function for calculating translational movement from the machine body position (XM) to the reference point position (RP2) using the machine body direction (DM) as a variable; f3 is a function for calculating translational movement from the machine body position (XM) to the reference point position (RP3) using the machine body direction (DM) as a variable; f4 is a function for calculating translational movement from the machine body position (XM) to the reference point position (RP4) using the machine body direction (DM) as a variable; and f5 is a function for calculating translational movement from the machine body position (XM) to the reference point position (RP5) using the machine body direction (DM) as a variable.

The machine body reference point velocity computation section 10e3 computes reference point velocities (RV1) to (RV5) that are moving velocities of the reference points on the basis of a machine body velocity (VM), the machine body direction (DM), the boom angle (θ2), the arm angle (θ3), the bucket angle (θ4), a swing angular velocity (ω1), a boom angular velocity (ω2), an arm angular velocity (ω3), and a bucket angular velocity (ω4). The machine body reference point velocity computation section 10e3 calculates the reference point velocities (RV1) to (RV5) of the reference points and outputs them collectively as a reference point velocity group (RV) to the risk integration section 10f.

The reference point velocity (RV1) is calculated on the basis of the (expression 13) given below from the two-dimensional machine body velocity (VM) in the horizontal direction, machine body direction (DM), boom angle (θ2), arm angle (θ3), bucket angle (θ4), swing angular velocity (ω1), boom angular velocity (ω2), arm angular velocity (ω3), and bucket angular velocity (ω4).

[Expression 13]

$$RV1 = VM + g_1(DM, \theta2, \theta3, \theta4, \omega1, \omega2, \omega3, \omega4) \quad \text{(expression 13)}$$

Here, in the (expression 13) above, g1 is a function for calculating a relative velocity to the machine body velocity (VM) at the reference point position (RP1) using the machine body direction (DM), boom angle (θ2), arm angle (θ3), bucket angle (θ4), swing angular velocity (ω1), boom angular velocity (ω2), arm angular velocity (ω3), and bucket angular velocity (ω4) as variables. Similarly, the reference point velocities (RV2) to (RV5) are calculated on the basis of the (expression 14) to (expression 17) given below from the machine body velocity (VM), machine body direction (DM), and swing angular velocity (ω1).

[Expression 14]

$$RV2=VM+g_2(DM,\omega_1) \quad \text{(expression 14)}$$

[Expression 15]

$$RV3=VM+g_3(DM,\omega_1) \quad \text{(expression 15)}$$

[Expression 16]

$$RV4=VM+g_4(DM,\omega_1) \quad \text{(expression 16)}$$

[Expression 17]

$$RV5=VM+g_5(DM,\omega_1) \quad \text{(expression 17)}$$

Here, in the (expression 14) to (expression 17) above, g2 is a function for calculating a relative velocity to the machine body velocity (VM) at the reference point position (RP2) using the machine body direction (DM) and the swing angular velocity (ω1) as variables; g3 is a function for calculating a relative velocity to the machine body velocity (VM) at the reference point position (RP3) using the machine body direction (DM) and the swing angular velocity (ω1) as variables; g4 is a function for calculating a relative velocity to the machine body velocity (VM) at the reference point position (RP4) using the machine body direction (DM) and the swing angular velocity (ω1) as variables; and g5 is a function for calculating a relative velocity to the machine body velocity (VM) at the reference point position (RP5) using the machine body direction (DM) and the swing angular velocity (ω1) as variables.

Figure 15:
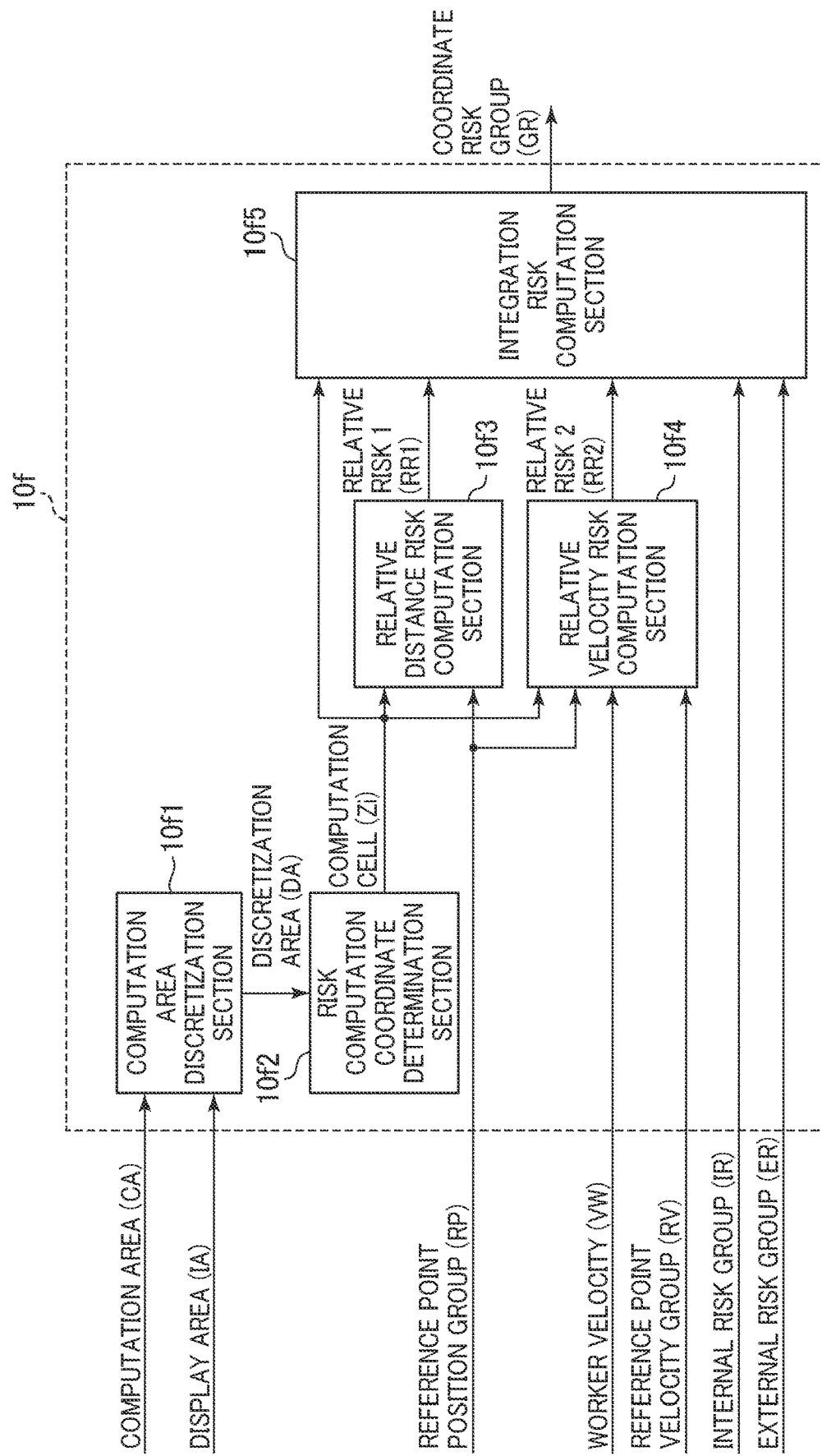
FIG. 15 is a functional block diagram depicting processing functions of a risk integration section according to the present embodiment.

FIG. 15 is a functional block diagram depicting processing functions of the risk integration section.

Referring to FIG. 15, the risk integration section 10f includes, as functioning sections for computing a coordinate risk group (GR), a computation area discretization section 10f1, a risk computation coordinate determination section 10f2, a relative distance risk computation section 10f3, a relative velocity risk computation section 10f4, and an integration risk computation section 10f5. The risk integration section 10f computes and outputs a coordinate risk group (GR) on the basis of various kinds of information inputted thereto to the risk display device 9.

The computation area discretization section 10f1 determines an area (discretization area (DA)) in which a risk is to be computed on the basis of the display area (IA) registered by the environment information registration device 1 and the computation area (CA) computed by the geometrical information computation section 10e, and outputs the discretization area (DA) to the risk computation coordinate determination section 10f2.

Figure 16:
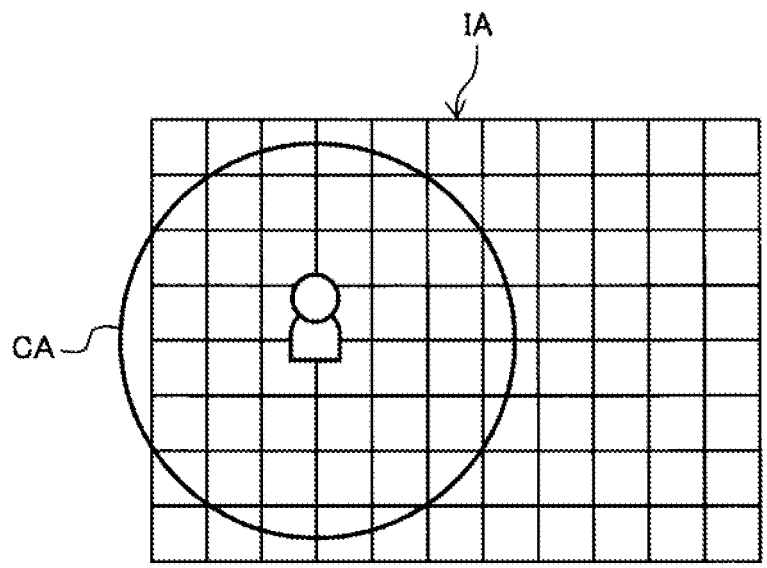
FIG. 16 is a view depicting details of a processing function of a computation area discretization section.
Figure 17:
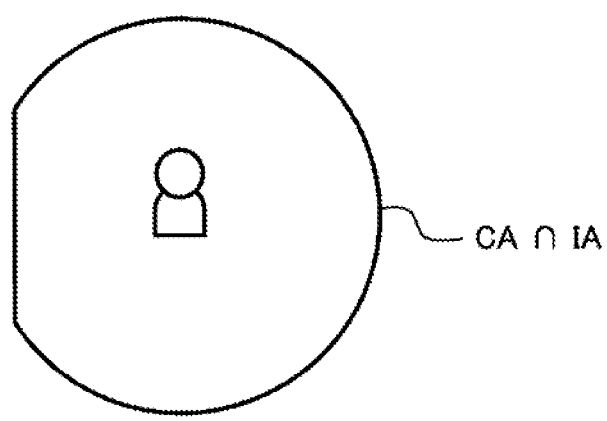
FIG. 17 is a view depicting details of another processing function of the computation area discretization section.
Figure 18:
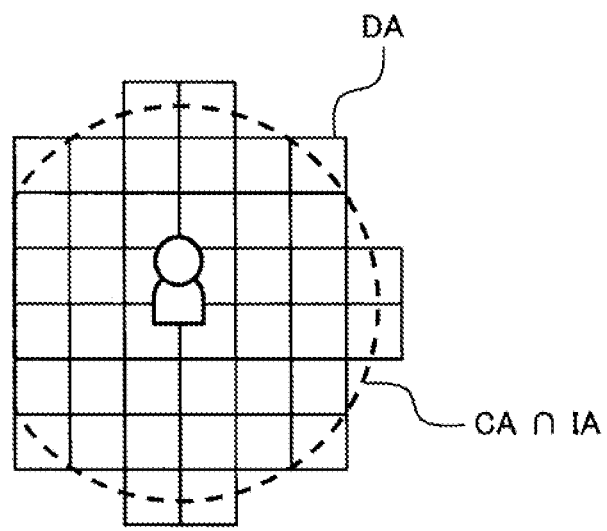
FIG. 18 is a view depicting details of a further processing function of the computation area discretization section.

FIGS. 16 to 18 are diagrams depicting details of processing functions of the computation area discretization section.

The computation area discretization section 10f1 first extracts an overlapping area (CA∩IA) in which the computation area (CA) and the display area (IA) overlap with each other as depicted in FIGS. 16 and 17. Here, the display area (IA) is a grid area discretized on the basis of a discretization size determined in advance.

Then, the computation area discretization section 10f1 extracts, from among cells included in the display area (IA), those cells whose center coordinates are included in the overlapping region (CA∩IA) to determine a discretization area (DA) as depicted in FIG. 18. The discretization size is determined on the basis of the resolution capability of the sensor for measuring the worker position (XW), the computation processing capability of the construction management device 10 and so forth.

The discretization area (DA) is defined as a set of cells (Z), and the cells (Z) are represented by a vector array including two-dimensional center coordinates and a number of each of them. That is, the discretization area (DA) is a matrix defined as DA=(Z1, Z2, ... ZN), and the number of two-dimensional center coordinate vectors configuring the matrix is equal to the total number of cells (Z) included in the discretization area (DA). Here, N is the total number of cells included in the discretization area (DA).

The risk computation coordinate determination section 10f2 selects one cell (Z) from within the discretization area (DA) outputted from the computation area discretization section 10f1 and outputs the cell (Z) as a computation cell (Zi) to the relative distance risk computation section 10f3, relative velocity risk computation section 10f4, and integration risk computation section 10f5. Here, i is a natural number indicative of the number of the cell included in the discretization area (DA), and the maximum number of i is equal to the total number (N) of the cells included in the discretization area (DA). The risk computation coordinate determination section 10f2 sequentially selects all of the cells (Z) included in the discretization area (DA) and executes the process until all of them are outputted.

The relative distance risk computation section 10f3 calculates a relative risk 1 (RR1) relating to a relative distance from the computation cell (Zi) and the reference point position group (RP) determined by the risk computation coordinate determination section 10f2. First, the relative distance risk computation section 10f3 selects a most neighboring reference point (RPmin) that is closest to the computation cell (Zi) from within a given reference point position group (RP) and computes the relative risk 1 (RR1) on the basis of the (expression 18) given below from the most neighboring reference point (RPmin) and the computation cell (Zi).

[Expression 18]

$$RR1=c_{E1}e^{-\lambda_{R1}(|RPmin-Zi|)} \quad \text{(expression 18)}$$

Here, in the (expression 18) above, CR1 is a coefficient that defines a maximum value of the relative risk 1 (RR1) and is equal to or higher than 0 (zero) and equal to or lower than 1, and λR1 is a coefficient for adjusting the degree of increase or decrease in the relative risk 1 (RR1) in response to increase or decrease in the absolute value of the difference between the cell (Zi) and the most neighboring reference point (RPmin).

Figure 19:
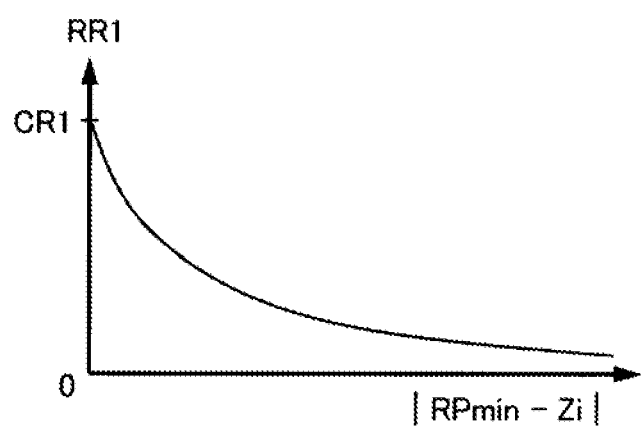
FIG. 19 is a view depicting a graph of risk computation in accordance with an (expression 18).

FIG. 19 is a graph of the risk computation in accordance with the (expression 18) above. As depicted in FIG. 19, the relative risk 1 (RR1) approaches its maximum value 1 as the absolute value of the difference between the cell (Zi) and the most neighboring reference point RPmin depicted in FIG. 21 decreases and approaches its minimum value 0 (zero) as the absolute value of the difference between the cell (Zi) and the most neighboring reference point RPmin increases.

The relative velocity risk computation section 10/4 calculates a relative risk 2 (RR2) relating to the relative velocity from the cell (Zi) determined by the risk computation coordinate determination section 10/2, a reference point position group (RP), a worker velocity (VW), and a reference point velocity group (RV). First, the relative velocity risk computation section 10/4 selects the most neighboring reference point (RPmin) closest to the cell (Zi) from within the given reference point position group (RP) similarly as in the computation by the relative distance risk computation section 10/3 and selects the velocity (RVmin) of the most neighboring reference point (RPmin) from within the reference point velocity group (RV). Then, the relative velocity risk computation section 10/4 computes the relative risk 2 (RR2) on the basis of the (expression 19) and (expression 20) from the relative position (RPmin–Zi) of the most neighboring reference point (RPmin) as viewed from the cell (Zi) and the relative velocity (RVmin–VW) of the most neighboring reference point (RPmin) as viewed from the worker velocity (VW).

[Expression 19]

$$RR2 = c_{R2} e^{-\lambda_{R2}(1/|EV|)} \quad \text{(expression 19)}$$

[Expression 20]

$$EV = \frac{(RPmin - Zi) \cdot (RVmin - VW)}{|RPmin - Zi||RVmin - VW|} \quad \text{(expression 20)}$$

Here, in the (expression 19) and the (expression 20) above, CR2 is a coefficient that defines a maximum value of the relative risk 2 (RR2) and is equal to or higher than 0 (zero) and equal to or lower than 1, and λR2 is a coefficient for adjusting the degree of increase or decrease in the relative risk 2 (RR2) in response to increase or decrease in the reciprocal of the absolute value of the closeness degree (EV).

Figure 20:
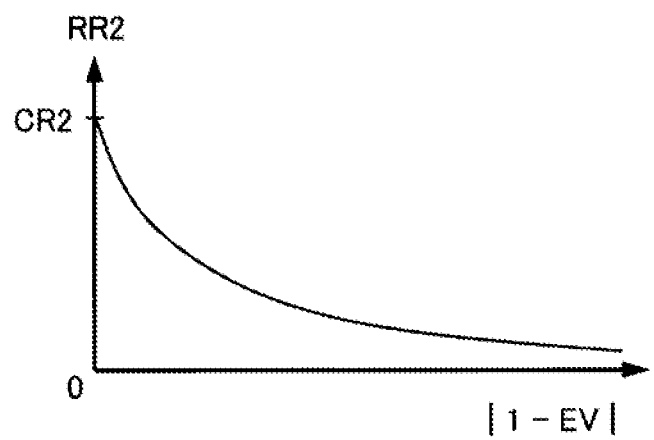
FIG. 20 is a view depicting a graph of risk computation in accordance with an (expression 19).
Figure 21:
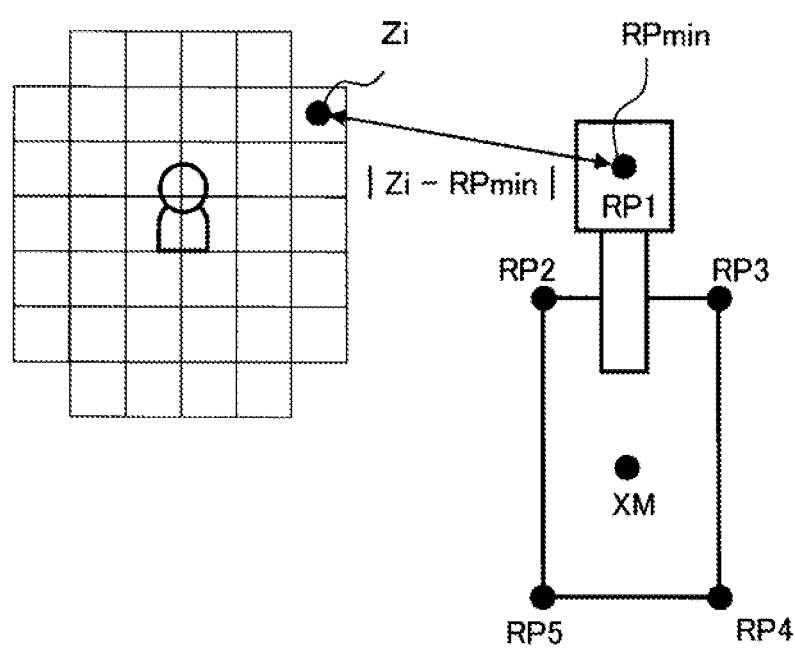
FIG. 21 is a view illustrating a relation between cells and a most neighboring reference point.
Figure 22:
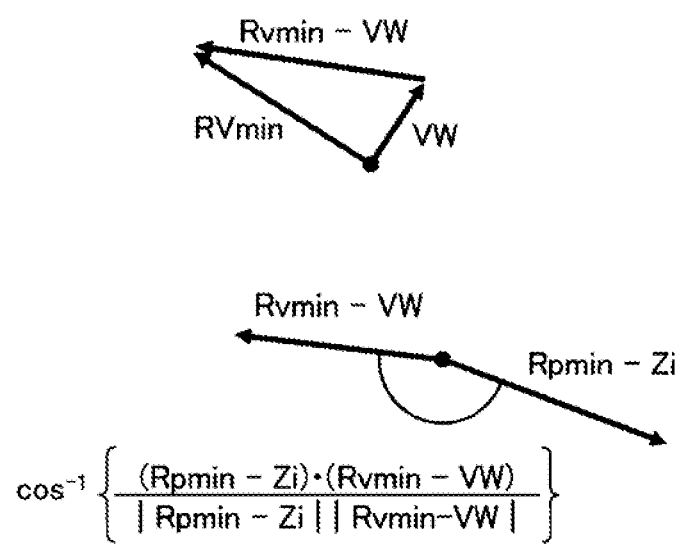
FIG. 22 is a view illustrating a definition of a closeness degree.

FIG. 20 is a graph of the risk computation in accordance with the (expression 19) given above. As depicted in FIG. 22, the closeness degree (EV) is defined as a cosine of the relative position vector (RPmin–Zi) and the relative velocity vector (RVmin–VW). Further, the relative risk 2 (RR2) approaches its maximum value 1 as the closeness degree (EV) approaches −1, that is, as the worker direction and the relative velocity direction approach the opposite directions to each other, and approaches its minimum value 0 (zero) as the closeness degree (EV) is spaced away from −1.

Figure 23:
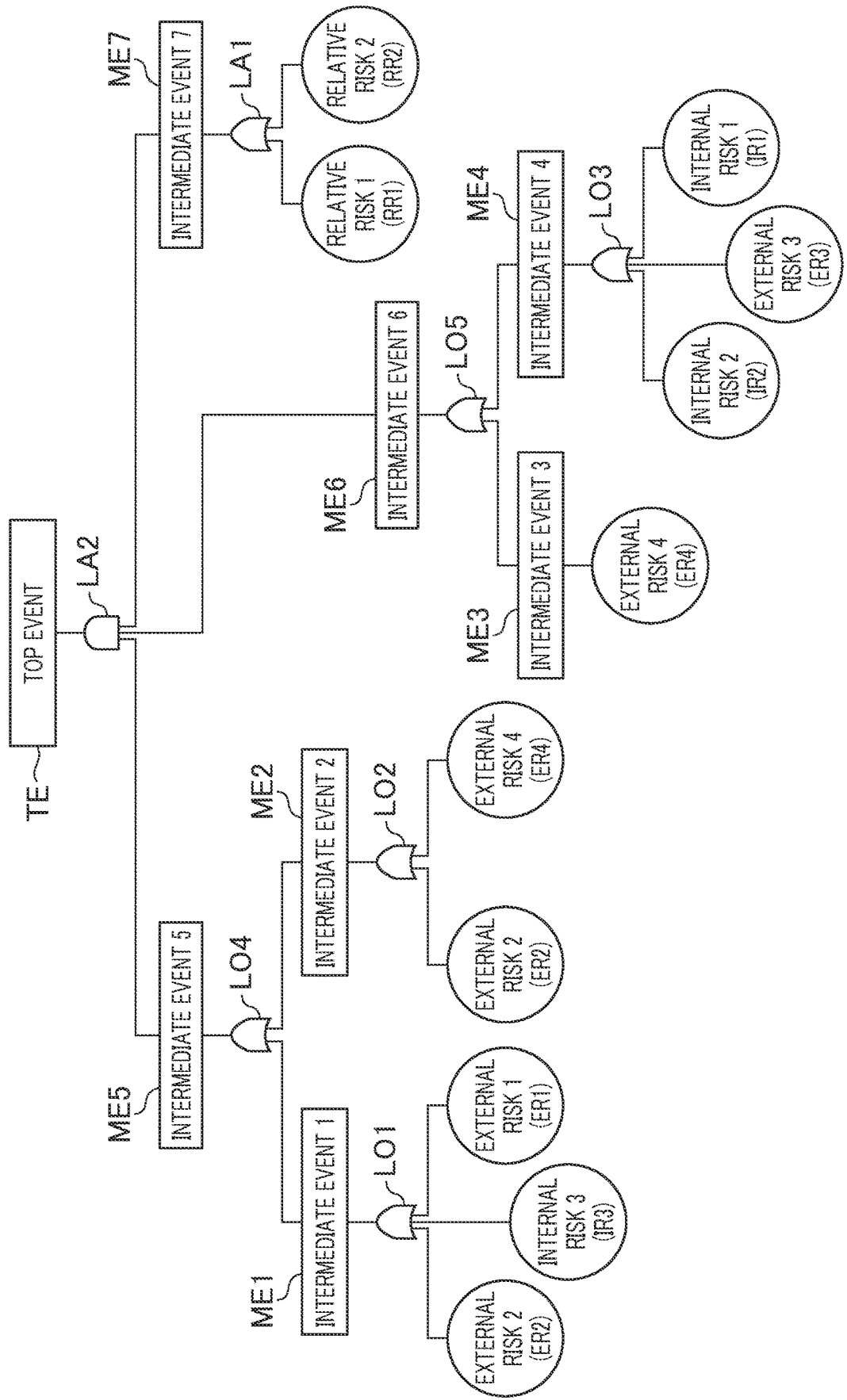
FIG. 23 is a view depicting the substance of processing of an integration risk computation section.

FIG. 23 is a diagram depicting the substance of processing of the integration risk computation section.

As depicted in FIG. 23, the integration risk computation section 10/5 performs integration of risks using an evaluation model of a tree structure constructed from AND type operators (LA) and OR type operators (LO). In FIG. 23, a case is exemplified in which internal risk groups (IR), external risk groups (ER), and relative risk groups (RR) are integrated.

It is assumed that, in the evaluation model, to one top event (TE), for example, seven intermediate events (ME) are connected. The top event (TE) in the evaluation model is defined as a minor collision between a person and a machine.

The intermediate event 1 (ME1) is defined as a case in which a surrounding check of a machine operator is insufficient and a worker around the machine is found out but late. In this case, the external risk 1 (ER1) relating to the fatigue degree of the machine operator, external risk (ER2) relating to the experiences of the machine operator, and internal risk 3 (IR3) relating to the work schedule of the surrounding worker are involved in the occurrence of the accident. The occurrence probability (MP1) of the intermediate event 1 (ME1) is calculated in accordance with the (expression 21) given below via an OR operator (LO1).

[Expression 21]

$$MP1 = 1 - (1 - ER1) \cdot (1 - ER2) \cdot (1 - ER3) \quad \text{(expression 21)}$$

The intermediate event 2 (ME2) is defined as a case in which the machine operator operates the machine wrong and the possibility that a worker around the machine may have a risk increases. In this case, the external risk 2 (ER2) relating to the experiences of the machine operator and the external risk 4 (ER4) relating to the operating velocity of the machine are involved in the occurrence of the intermediate event 2 (ME2). The occurrence probability (MP2) of the intermediate event 2 (ME2) is calculated in accordance with the (expression 22) given below via an OR operator (LO2).

[Expression 22]

$$MP2 = 1 - (1 - ER2) \cdot (1 - ER4) \quad \text{(expression 22)}$$

The intermediate event 3 (ME3) is defined as a case in which, when the machine operates toward a worker, the avoiding action of the worker is not performed in time. In this case, the external risk 4 (ER4) relating to the operating velocity of the machine is involved in the occurrence of the intermediate event 3 (ME3). The occurrence probability (MP3) of the intermediate event 3 (ME3) coincides with that of the external risk (ER4) and is therefore calculated in accordance with the (expression 23) given below.

[Expression 23]

$$MR3 = ER4 \quad \text{(expression 23)}$$

The intermediate event 4 (ME4) is defined as a case in which a worker does not notice approach of the machine and an avoiding action by the worker does not occur. In this case, the internal risk 1 (IR1) relating to the fatigue degree of the worker, internal risk 2 (IR2) relating to the experiences of the worker, and external risk 3 (ER3) relating to the work schedule of the machine are involved in the occurrence of the intermediate event 4 (ME4). The occurrence probability (MP4) of the intermediate event 4 (ME4) is calculated in accordance with the (expression 24) given below via an OR operator (LO3).

[Expression 24]

$$MP4 = 1 - (1 - IR1) \cdot (1 - IR2) \cdot (1 - ER3) \quad \text{(expression 24)}$$

The intermediate event 5 (ME5) is defined as a case in which the machine accidentally moves close to a surrounding worker. In this case, the intermediate event 1 (ME1) that the machine operator finds out the worker but late and the intermediate event 2 (ME2) that the machine operator mistakes in operation of the machine are involved in the occurrence of the intermediate event 5 (ME5). The occurrence probability (MP5) of the intermediate event 5 (ME5) is calculated in accordance with the (expression 25) given below via an OR operator (LO4).

[Expression 25]

$$MP5 = 1 - (1 - MP1) \cdot (1 - MP2) \quad \text{(expression 25)}$$

The intermediate event 6 (ME6) is defined as a case in which, even if the machine moves close to a surrounding worker, the worker does take an evasive action. In this case, the intermediate event 3 (ME3) that the evasive behavior by the worker is not taken in time and the intermediate event 4 (ME4) that the worker does not notice the approach of the machine are involved in the occurrence of the intermediate event 6 (ME6). The occurrence probability (MP6) of the intermediate event 6 (ME6) is calculated in accordance with the (expression 26) given below via an OR operator (LO5).

[Expression 26]

$$MP6=1-(1-MP3)\cdot(1-MP4) \qquad \text{(expression 26)}$$

The intermediate event 7 (ME7) is defined as a case in which a worker and the machine come close to each other by an action of the worker and operation of the machine. In this case, the relative risk 1 (RR1) relating to the relative distance between the worker and the machine and the relative risk 2 (RR2) relating to the operation of the machine toward the worker are involved in the occurrence of the intermediate event 7 (ME7). The occurrence probability (MP7) of the intermediate event 7 (ME7) is calculated in accordance with the (expression 27) given below via an AND operator (LA1).

[Expression 27]

$$MP7=RR1\cdot RR2 \qquad \text{(expression 27)}$$

The top event (TE) is defined as a case in which a worker and the machine contact with each other. In this case, the intermediate event 5 (ME5) that the machine accidentally comes closer to a surrounding worker, intermediate event 6 (ME6) that the worker does not take an evasive action against the approach of the machine, and intermediate event 7 (ME7) that the worker and the machine are close to each other are involved in the occurrence of the top event (TE). The occurrence probability (TP) of the top event (TE) is calculated in accordance with the (expression 28) given below via an AND operator (LA2).

[Expression 28]

$$TP=MP5\cdot MP6\cdot MP7 \qquad \text{(expression 28)}$$

The occurrence probability (TP) of the top event (TE) is computed for all cells (Z). The coordinate risk group (GR) is defined as a matrix in which (GRD) that is a scalar value indicative of a magnitude of a risk and a three-dimensional vector GRi=(GRPi, GRDi) including two-dimensional coordinates (GRP) of corresponding cells are connected to each other for all of the cells, and is represented as GR=(GR1, GR2, . . . , GRN).

Figure 24:
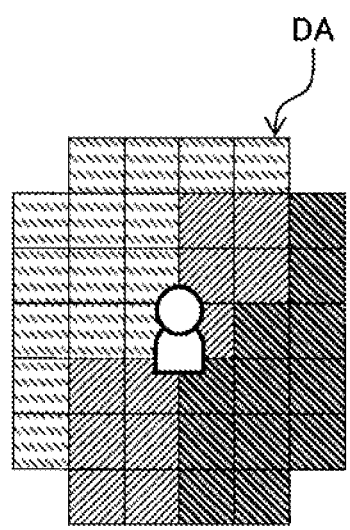
FIG. 24 is a view depicting an example of a risk display image on a risk display device.
Figure 25:
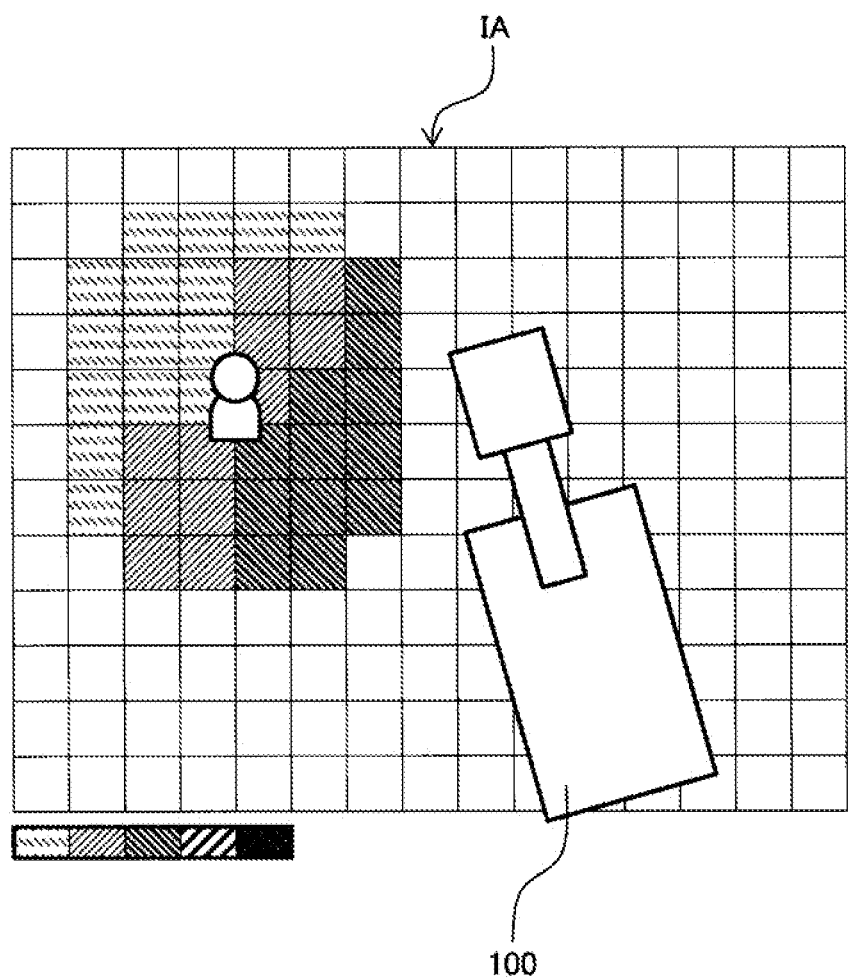
FIG. 25 is a view depicting another example of a risk display image on the risk display device.

FIGS. 24 and 25 are views depicting an example of a risk display image by the risk display device.

The risk display device 9 displays a coordinate risk group (GR) computed by the construction management device 10, according to the display area (IA) registered in the environment information registration device 1. In the risk display image of the risk display device 9, the coordinate risk group (GR) corresponds to the cells (Z) in the discretization area (DA), and a drawing result of each cell is determined in response to the magnitude of the risk. That is, on the risk display device 9, for example, the magnitude of a risk is represented by a color such that the cell (Z) having a higher risk is drawn with a deeper color. However, in FIGS. 24 and 25, a difference in color of cells is indicated by hatching lines or the like for the convenience of illustration. It is to be noted that, in FIGS. 24 and 25, patterns (hatching lines) are exemplified such that, on a color scale depicted at a lower left portion in FIG. 25, a pattern depicted relatively on the right side indicates a higher risk.

As depicted in FIG. 25, the coordinate risk (GR) is projected to the display area (IA) of the risk display device 9. Cells existing in a region of the region ((complementary set of DA)∩IA) that is outside the range of the discretization area (DA) for which a risk is computed are drawn assuming that their risk has the lowest value. In FIG. 25, the cells mentioned are displayed in a state in which the color thereof is lightest.

As depicted in FIG. 25, on the risk display device 9, the hydraulic excavator 100 that is a work machine on the side that provides a risk, a worker on the side that suffers the risk, and cells (Z) indicative of results of computation of a risk are displayed. The results of computation are updated in response to a computation cycle of the construction management device 10. As the updating cycle becomes fast, it is possible to cope with a risk change in the construction environment more quickly. However, the cycle possible for updating is restricted by the quantity of cells to be drawn and the number of processes in risk computation.

Figure 26:
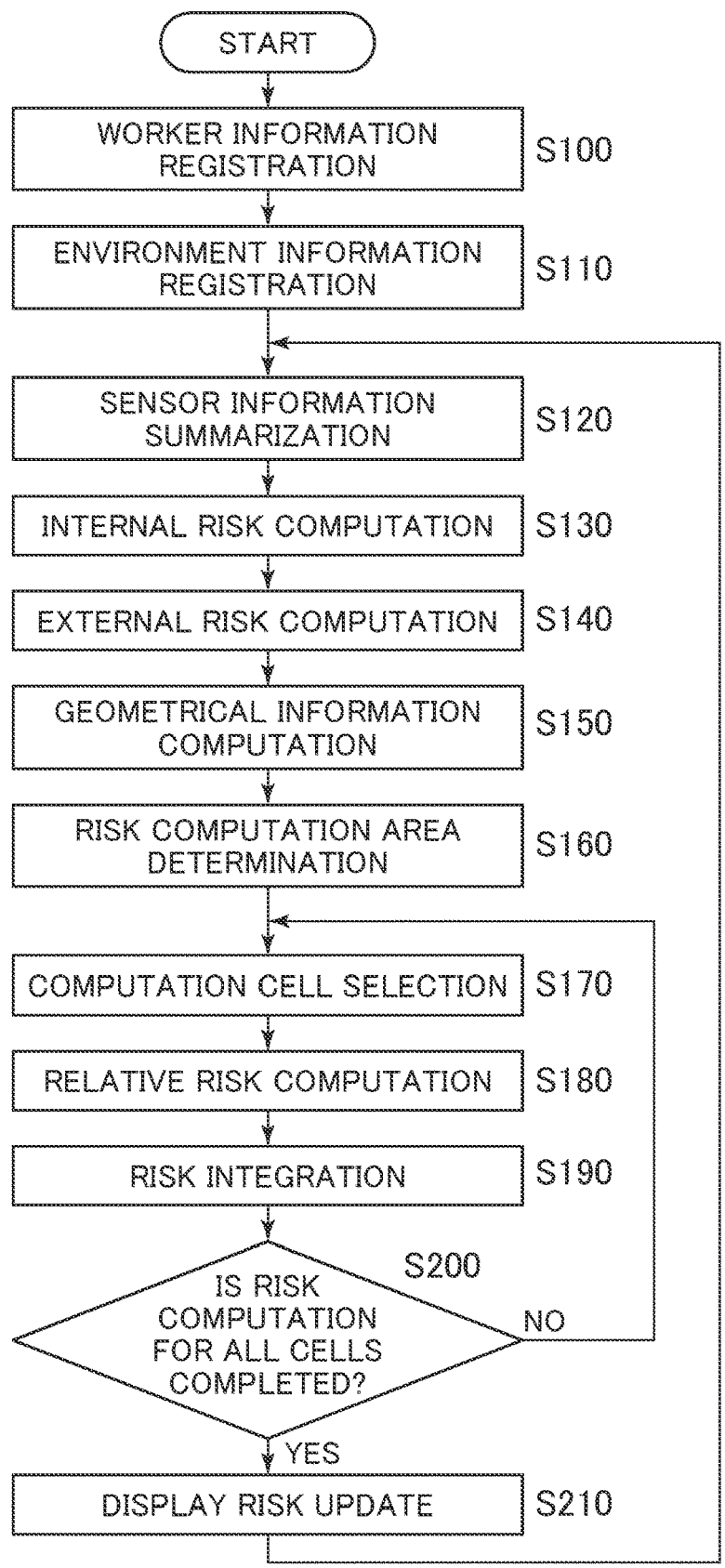
FIG. 26 is a flow chart illustrating the substance of processing of a risk computation process in the construction management system.

FIG. 26 is a flow chart depicting the substance of processing of the risk computation process in the construction management system.

Referring to FIG. 26, in the rink computation process, a pre-process for registering worker information through the worker information registration device 2 is performed first as an initial process for starting periodic processing (step S100), and a pre-process for registering environment information whose risk is to be displayed through the environment information registration device 1 is performed (step S110). In step S100, personal information on a worker and a machine operator is inputted through the worker information registration device 2. Further, in step S110, a display area (IA) in which a risk is to be computed and displayed is inputted through the environment information registration device 1.

In the state in which the initial processes are completed, the construction management device 10 summarizes information on the measuring devices 3 to 8 installed on the worker and the machine into the internal information acquisition section 10a and the external information acquisition section 10b (step S120), and the internal risk computation section 10c computes an internal risk group (IR) at the present point of time on the basis of the information summarized by the internal information acquisition section 10a (step S130). Further, the external risk computation section 10d computes an external risk group (ER) at the present point of time on the basis of the information summarized by the external information acquisition section 10b (step S140).

Further, the geometrical information computation section 10e computes a computation area (CA) in which a risk is to be computed, a reference point position group (RP) of the machine at the present point of time, and a reference point velocity group (RV) on the basis of geometrical information relating to the worker summarized by the internal information acquisition section 10a and geometrical information relating to the work machine (hydraulic excavator 100) summarized by the external information acquisition section 10b (step S150).

Then, the computation area discretization section 10f1 of the risk integration section 10f determines a discretization area (DA) that is a risk computation area at the present point of time on the basis of the display area (IA) and the computation area (CA).

Then, the risk computation coordinate determination section 10f2 selects one of cells (Zi), for which the computation is not completed, from among the N cells (Zi) (i=1 to N: positive integer) that configure the discretization area (DA), as a cell for which the computation is to be performed (step S170). Then, for the selected cell (Zi), the relative distance risk computation section 10f3 computes a relative risk 1 (RR1) relating to the relative distance, and the relative velocity risk computation section 10f4 computes a relative risk 2 (RR2) relating to the relative velocity (step S180).

Then, the integration risk computation section 10f5 computes a coordinate risk (GR) at the cell (Zi) using the evaluation model (refer to FIG. 23) on the basis of the relative risk 1 (RR1) computed by the relative distance risk computation section 10f3, relative risk 2 (RR2) computed by the relative velocity risk computation section 10f4, internal risk group (IR) computed by the internal risk computation section 10c, and external risk group (ER) computed by the external risk computation section 10d (step S190).

Here, it is decided whether or not the computation is completed for all cells (Zi) (i=1 to N) (step S200), and when the decision result is NO, the processes in steps S170 to S190 are repeated until the decision result becomes YES, that is, until the process for all cells (Zi) is completed.

On the other hand, when the decision result in step S200 is YES, that is, in a case where the computation is completed for all cells (Zi) that configure the discretization area (DA), the information on the coordinate risk group (GR) to be outputted to the risk display device 9 is updated to update the risk display image to be displayed on the risk display device (step S210). Thereafter, the processing returns to the processing to step S120 to perform the risk computation process for the next time.

In the construction management device 10, since the processes in steps S120 to S210 are repeated according to the computation cycle, also the risk display image of the risk display device 9 representing the computation result is updated according to the computation cycle.

FIGS. 27 to 30 are views depicting an example of a risk display image on the risk display device. It is to be noted that, in FIGS. 27 to 30, patterns are exemplified such that, on a color scale depicted at a lower left portion in FIGS. 27 to 30, a pattern depicted relatively on the right side indicates a higher risk.

Figure 27:
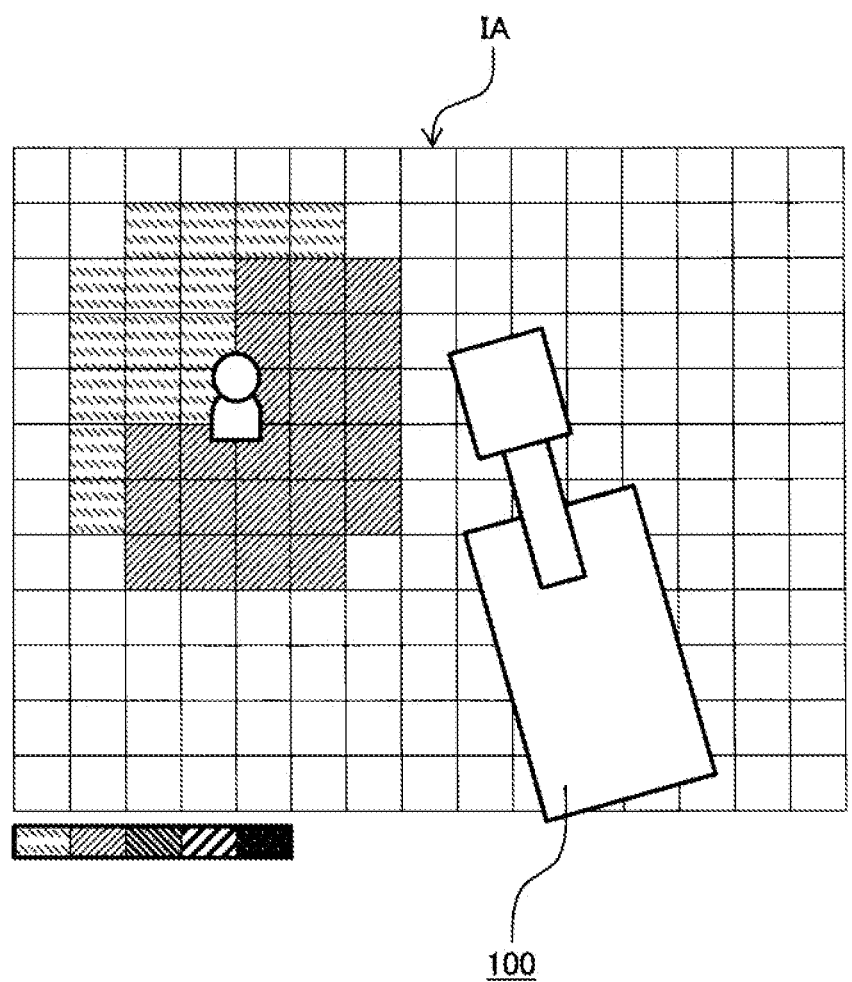
FIG. 27 is a view depicting an example of a risk display image on the risk display device.

FIG. 27 is a view depicting an example of a risk display image in a case where both the internal risk of the worker and the external risk of the machine are low. It is supposed that the worker is low in fatigue degree and abundant in work experience and is working correctly at a scheduled work position. In regard to the machine, it is supposed that the machine operator is low in fatigue degree and abundant in work experience and, the machine is being operated at an appropriate velocity at a scheduled work position. In this case, although a risk in a direction in which the worker and the machine approach each other is displayed relatively high from an influence of the computation result of the relative risk, the overall risk is evaluated to be low.

Figure 28:
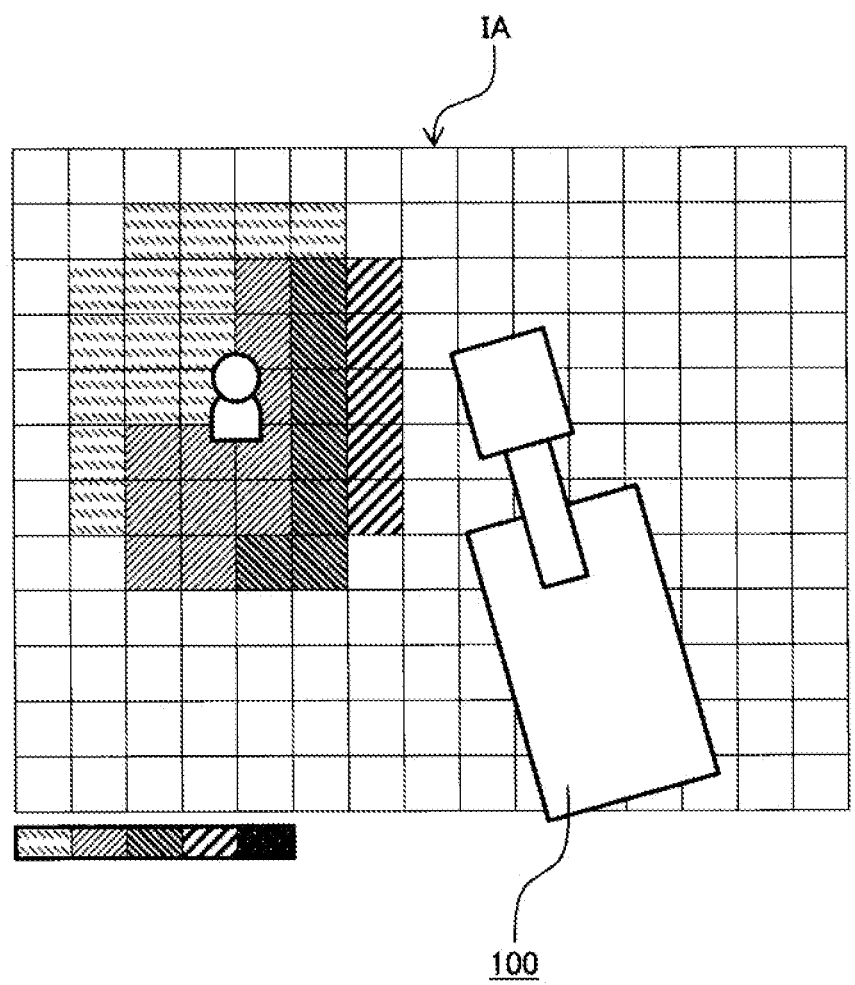
FIG. 28 is a view depicting another example of a risk display image on the risk display device.

FIG. 28 is a view depicting an example of a risk display image in a case where, although the internal risk of the worker is low, the external risk of the machine is high. It is supposed that the worker is low in fatigue degree and abundant in work experience and is working correctly at a scheduled work position. In regard to the machine, it is supposed that, although the machine operator is low in fatigue degree and abundant in work experience and is working at a scheduled work position, the operation is so rough that the machine is operated at an excessively high velocity. In this case, the overall risk is increased by an influence of the external risk relating to the operating velocity. Simultaneously, where the machine operates in a direction toward the worker from an influence of the relative risk, evaluation is made such that the risk in the direction in which the worker and the machine approach each other is remarkably high.

Figure 29:
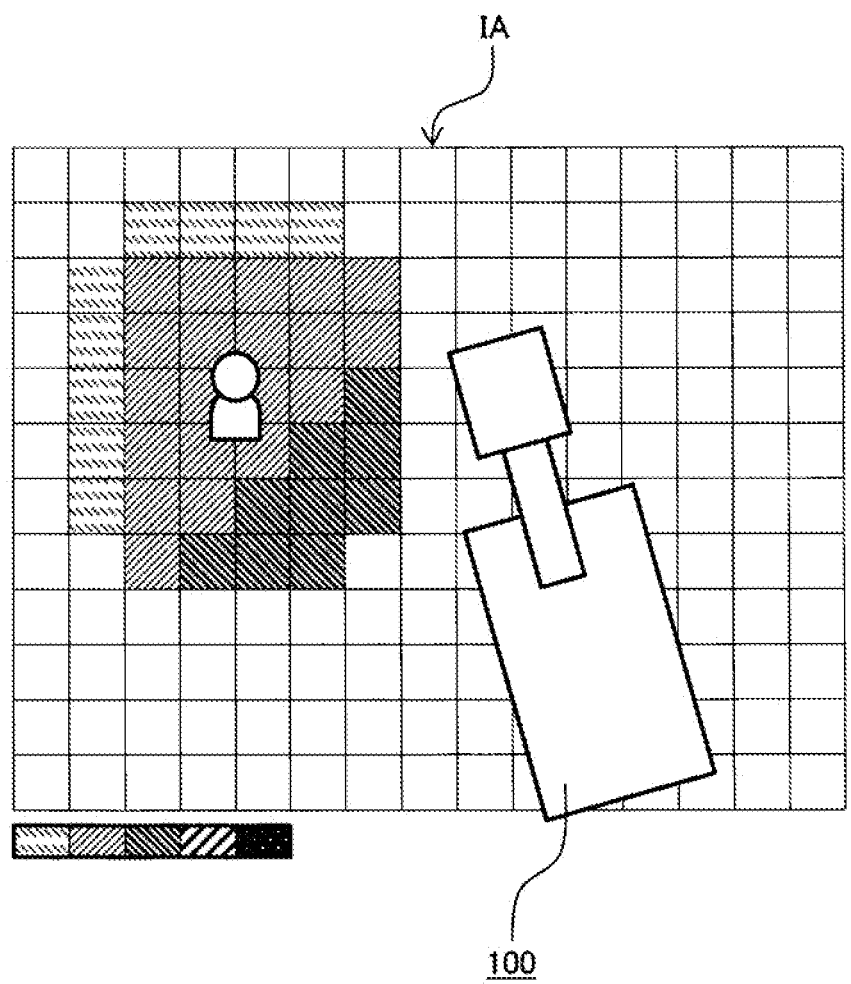
FIG. 29 is a view depicting a further example of a risk display image on the risk display device.

FIG. 29 is a view depicting an example of a risk display image in a case where, although the internal risk of the worker is high, the external risk of the machine is low. It is supposed that, although the worker is low in fatigue degree and abundant in work experience, the worker exists at a work position that is not scheduled. In regard to the machine, it is assumed that the machine operator is low in fatigue degree and abundant in work experience and the machine is operated at an appropriate velocity at a scheduled work position. In this case, evaluation is made such that the overall risk is high from the influence of the internal risk relating to the work schedule. However, since the influence of the external risk by operation of the machine is less, evaluation being made such that the risk in the direction in which the worker approaches the machine is excessively high is avoided.

Figure 30:
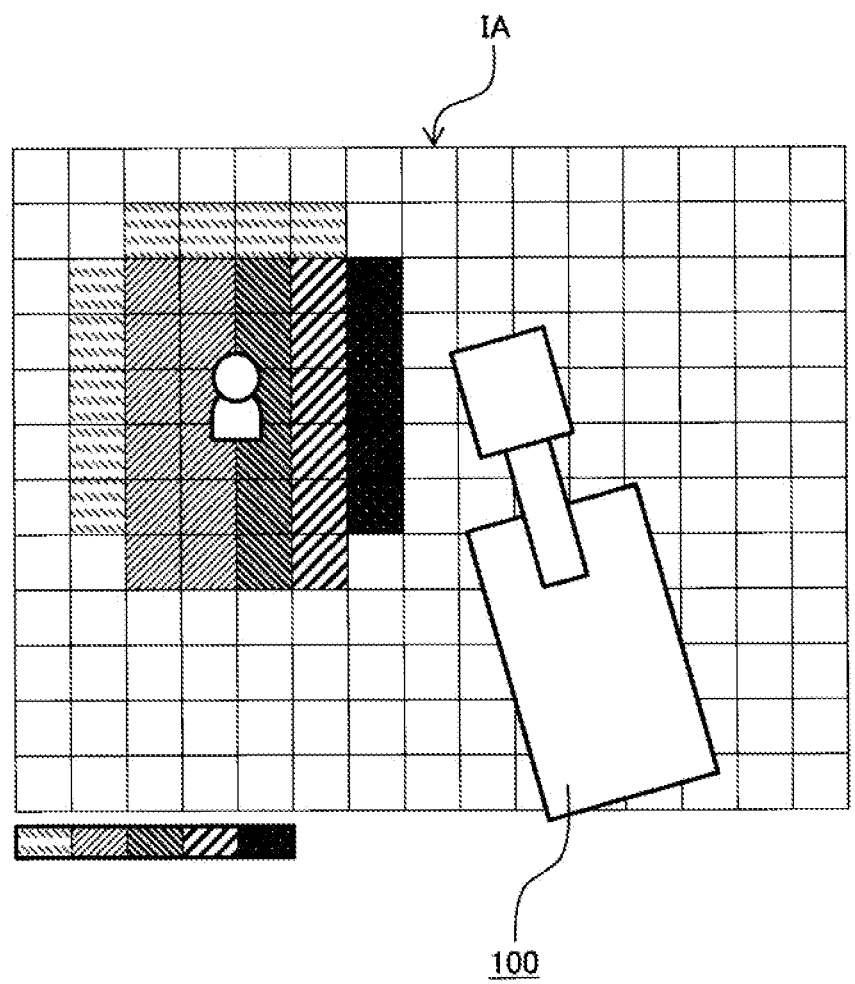
FIG. 30 is a view depicting a still further example of a risk display image on the risk display device.

FIG. 30 is a view depicting an example of a risk display image in a case where both the internal risk of the worker and the external risk of the machine are high. In regard to the worker, it is assumed that, although the worker is low in fatigue degree and abundant in work experience, the worker exists at an unscheduled work position. In regard to the machine, it is assumed that, although the machine operator is low in fatigue degree and abundant in work experience and is working at a scheduled work position, the operation is so rough that the machine is being operated at an excessively high velocity. In this case, it is estimated that the overall risk is very high from the influence of the internal risk relating to the work schedule and the influence of the external risk relating to the operation velocity. Further, where the machine operates in a direction toward the worker from the influence of the relative risk, evaluation is made such that the risk in the direction in which the worker and the machine come closer to each other is remarkably high.

Working effects of the present embodiment configured in such a manner as described above are described with reference to FIGS. 31 to 34.

Here, as a comparative example, a case is considered in which risk computation is performed taking only the relative relation between a worker and a machine into consideration, that is, a case is considered in which the coordinate risk group (GR) is computed using only a result of the intermediate event 7 (ME7) of the evaluation model depicted in FIG. 23 as the top event (TE).

First, a case is considered in which both the internal risk of the worker and the external risk of the machine are low.

Figure 31:
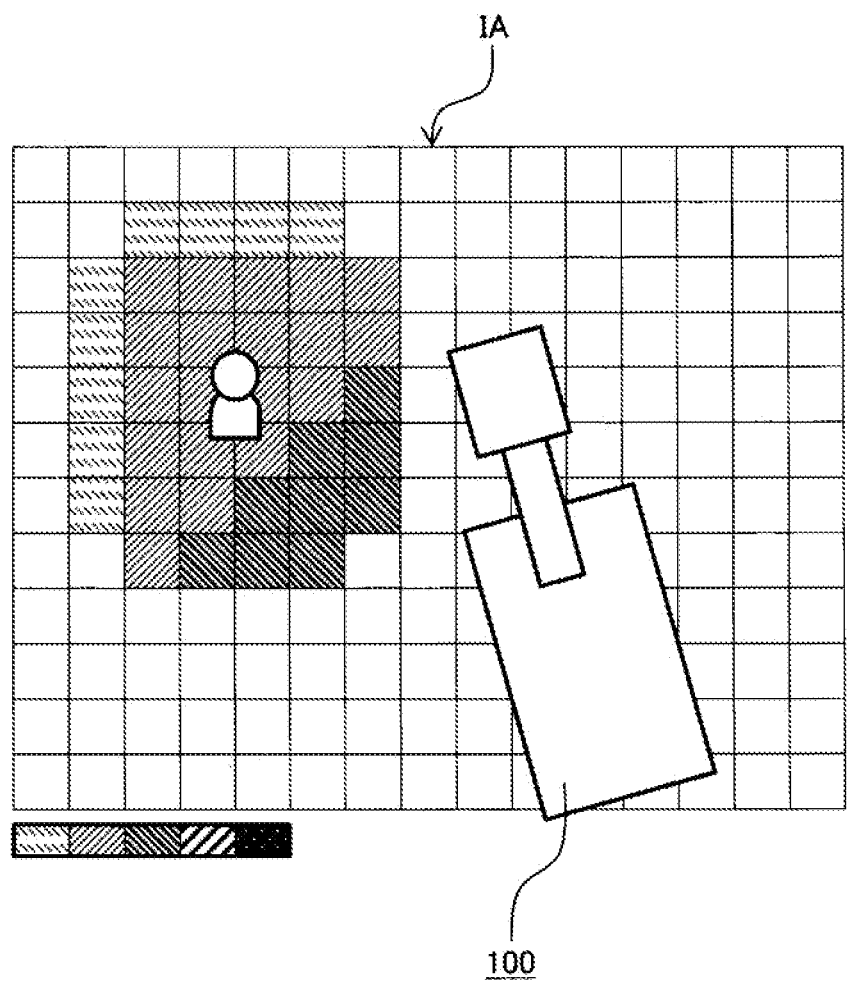
FIG. 31 is a view depicting a yet further example of a risk display image on the risk display device.

In the case of the comparative example, the risk is evaluated from the relative distance and the relative velocity irrespective of the states of the worker and the machine. Accordingly, where the worker and the machine are close to each other as depicted in FIG. 31, the risk is generally evaluated rather higher than an actual possible risk.

Figure 32:
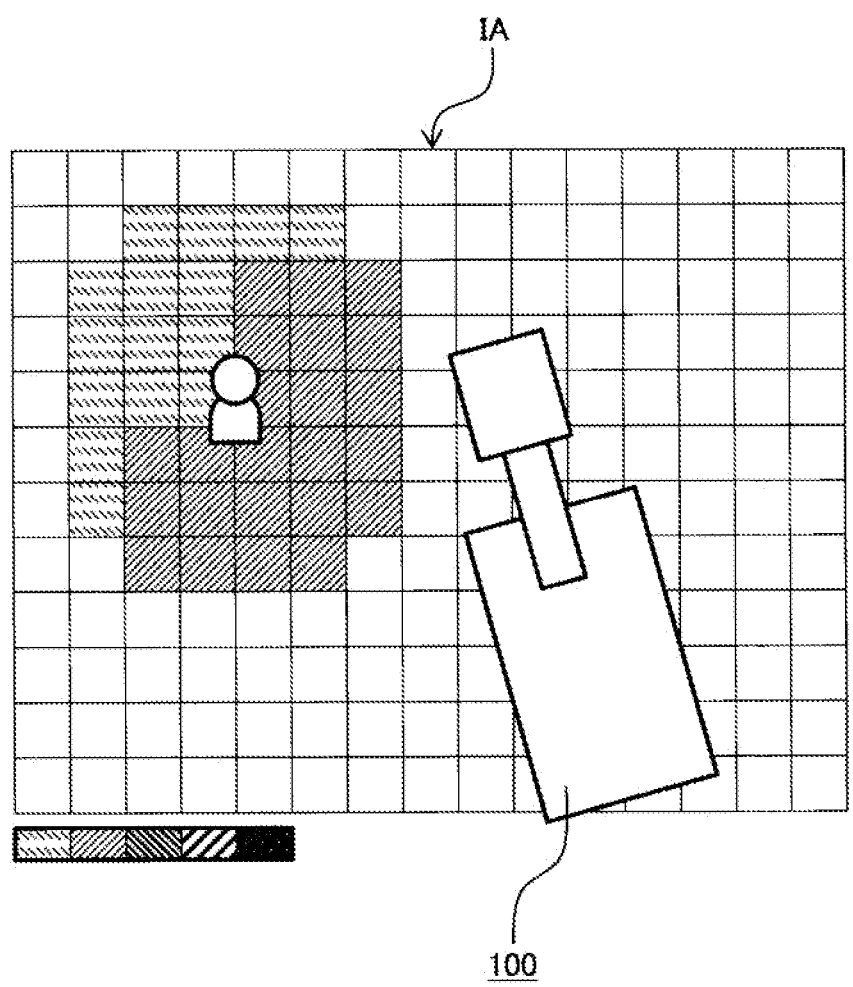
FIG. 32 is a view depicting a yet further example of a risk display image on the risk display device.

In contrast, in the present embodiment, the risk is evaluated taking the internal risk of the worker and the external risk of the machine into consideration. Accordingly, even in a case in which the worker and the machine are close to each other, if both the internal risk and the external risk are low, a risk that is near to an actual possible risk is evaluated, and therefore, the risk is generally evaluated low in comparison with that in the comparative example as depicted in FIG. 32. In particular, in the present embodiment, even in a scene in which the worker and the machine are close to each other, in a case in which there exists no risky factor in the worker and the machine, the risk at the construction site can be evaluated with a higher degree of accuracy without evaluating the risk unreasonably high as in the comparative example, and an evaluation result can be presented in a more appropriate form.

Now, a case is considered in which one of the internal risk of the worker and the external risk of the machine is high and the other is low.

Figure 33:
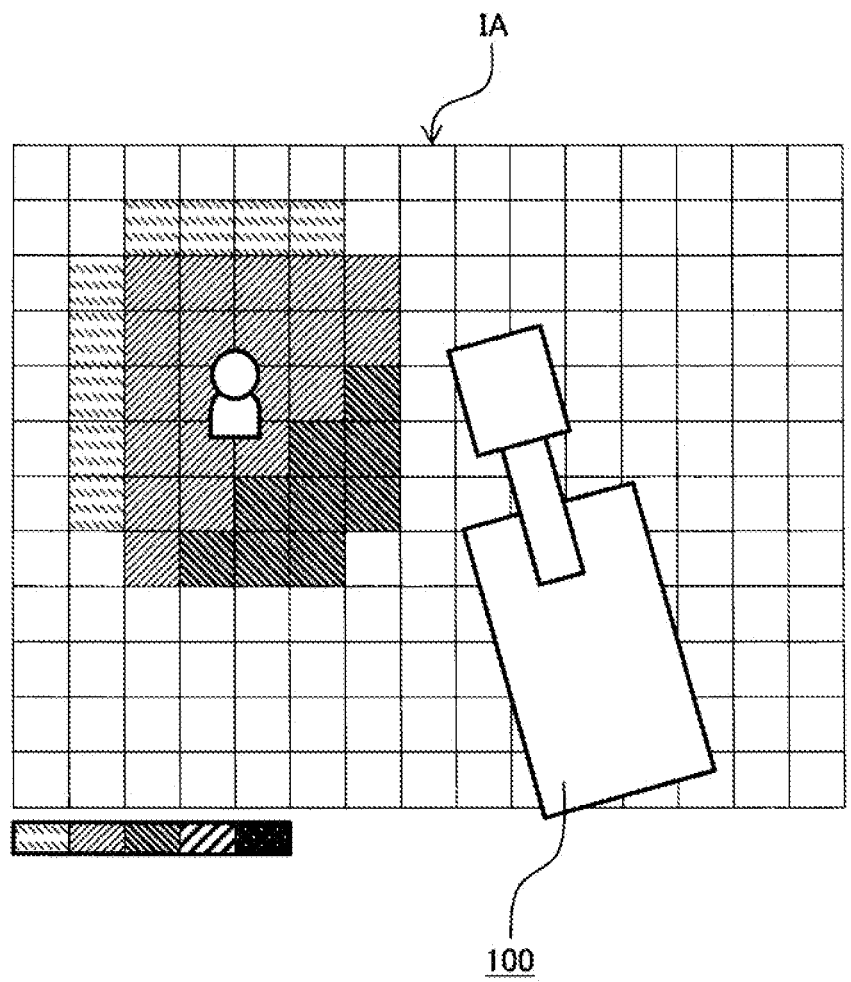
FIG. 33 is a view depicting a yet further example of a risk display image on the risk display device.

In the case of the comparative example, the risk is evaluated from the relative distance and the relative velocity irrespective of the states of the worker and the machine. Accordingly, in the comparative example, there is the possibility that the risk may be evaluated unreasonably to be lower than an actual possible risk. In this case, the evaluation result is the same as the case where both the internal risk and the external disk of the machine are low (refer to FIG. 31) as depicted in FIG. 33.

Figure 34:
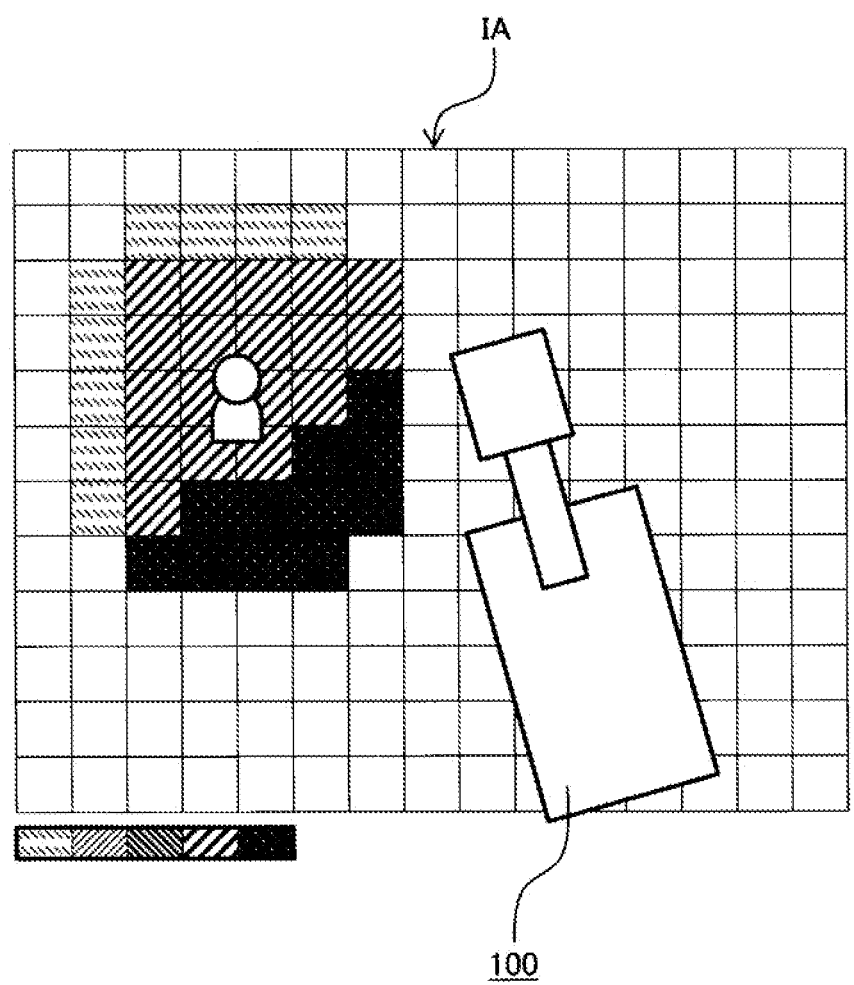
FIG. 34 is a view depicting a yet further example of a risk display image on the risk display device.

In contrast, in the present embodiment, the risk is evaluated taking the internal risk and the external risk of the machine into consideration. Accordingly, even in a case where one of the internal risk of the worker and the external risk of the machine is high and the other is low, since risky factors arising from the worker and the machine are taken into consideration, accurate risk evaluation near to an actual possible risk can be performed as depicted in FIG. 34 and the risk can be evaluated reasonably to be high in comparison with that in the comparative example. In other words, in the present embodiment, a risk at a construction site can be evaluated with a higher degree of accuracy and an evaluation result can be presented in a more appropriate form. Further, the construction manager can accurately evaluate the risk according to the present embodiment and can perform early and appropriate notification against a risky behavior and effective modification of the construction schedule.

Second Embodiment

A second embodiment of the present invention is described with reference to FIGS. 35 to 38.

The present embodiment indicates a case in which a two workers of a worker 1 and a worker 2 are the side that suffers a risk and one work machine (hydraulic excavator 100) is the side that provides a risk.

Figure 35:
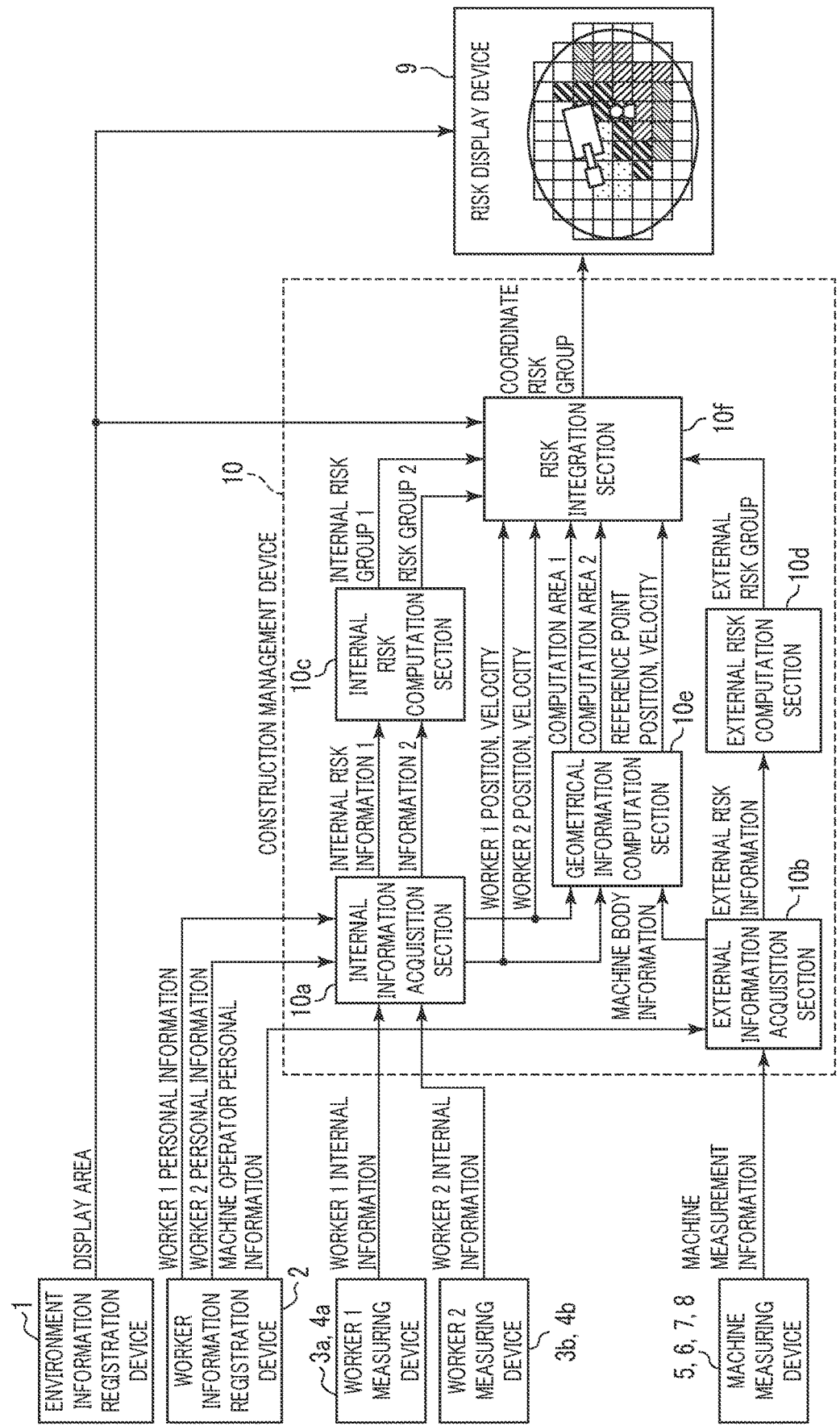
FIG. 35 is a functional block diagram depicting processing functions of a construction management system according to a second embodiment.
Figure 36:
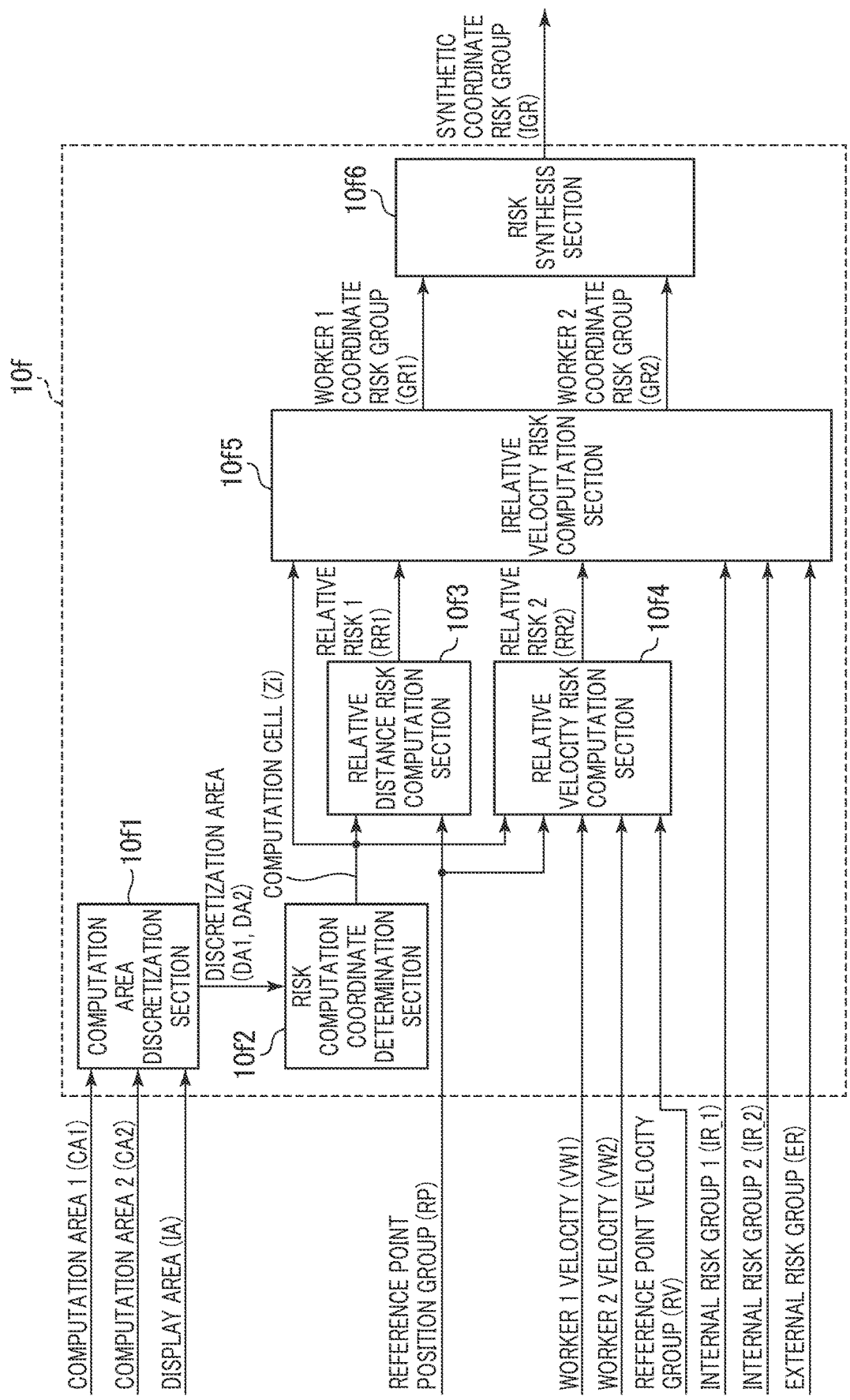
FIG. 36 is a functional block diagram depicting processing functions of a risk integration section according to the second embodiment.

FIG. 35 is a functional block diagram depicting processing functions of a construction management system according to the present embodiment. FIG. 36 is a functional block diagram depicting processing functions of a risk integration section according to the present embodiment. In FIGS. 35 and 36, elements similar to those in the first embodiment are denoted by like reference characters and overlapping description of them is omitted.

Referring to FIG. 35, the construction management system is configured from an environment information registration device 1, a worker information registration device 2, worker 1 measuring devices (worker position measuring device 3a and worker biometric information measuring device 4a), worker 2 measuring devices (worker position measuring device 3b and worker biometric information measuring device 4b), machine measuring devices (machine body position measuring device 5, machine body posture measuring device 6, machine front implement posture measuring device 7, and machine operator biometric information measuring device 8), a risk display device 9, and a construction management device 10.

In the worker information registration device 2, personal information on the workers (worker 1 and worker 2) who work at a construction site and the operator of the work machine (hydraulic excavator 100) is registered.

The worker position measuring devices 3a and 3b measure position information and a velocity of the worker 1 and the worker 2 and are provided for the worker 1 and the worker 2, respectively.

The worker biometrical information measuring devices 4a and 4b measure biometrical information on the worker 1 and the worker 2 and are provided for the worker 1 and the worker 2, respectively.

The construction management device 10 includes an internal information acquisition section 10a, an external information acquisition section 10b, an internal risk computation section 10c, an external risk computation section 10d, a geometrical information computation section 10e, and a risk integration section 10f.

The internal information acquisition section 10a acquires and summarizes information obtained by measurement of various states of the side that suffers a risk (i.e., the workers). In particular, the internal information acquisition section 10a acquires, in regard to the worker 1 and the worker 2, worker personal information registered in the worker information registration device 2, information on the positions and the velocities of the workers measured by the worker position measuring devices 3a and 3b, and biometric information on the workers measured by the worker biometric information measuring devices 4a and 4b, summarizes the acquired information as internal risk information 1 and internal risk information 2 unique to the workers, and outputs the summarized information to the internal risk computation section 10c. Further, the internal information acquisition section 10a outputs information on the positions and the velocities (VW1 and VW2) of the worker 1 and the worker 2 to the geometrical information computation section 10e and the risk integration section 10f.

The internal risk computation section 10c calculates the internal risk group (IR) relating to each of the worker 1 and the worker 2 and outputs the internal risk groups (IR) as an internal risk group 1 (IR_1) and an internal risk group 2 (IR_2) to the risk integration section 10f.

The geometrical information computation section 10e computes a computation area (CA) for each of the worker 1 and the worker 2, and outputs the computation area for the worker 1 as a computation area 1 (CA1) and outputs the computation area for the worker 2 as a computation area 2 (CA2) to the risk integration section 10f.

Referring to FIG. 36, the risk integration section 10f includes, as functioning sections that compute a synthetic coordinate risk group (IGR), a computation area discretization section 10f/1, a risk computation coordinate determination section 10f/2, a relative distance risk computation section 10f/3, a relative velocity risk computation section 10f/4, an integration risk computation section 10f/5, and a risk synthesis section 10f/6. The risk integration section 10f computes coordinate risk groups (GR1 and GR2) on the basis of various kinds of information inputted thereto, synthesizes them to compute a synthetic coordinate risk group (IGR), and outputs the synthetic coordinate risk group (IGR) to the risk display device 9.

The computation area discretization section 10f/1 computes a discretization area 1 (DA1) and a discretization area 2 (DA2) for each of the worker 1 and the worker 2 on the basis of the computation area 1 (CA1), computation area (CA2), and display area (IA), and outputs them to the risk computation coordinate determination section 10f/2.

The relative distance risk computation section 10f3 calculates a relative risk 1 (RR1) for each of the discretization area 1 (DA1) and the discretization area 2 (DA2).

The relative velocity risk computation section 10f4 calculates a relative risk 2 (RR2) for each of the worker 1 and the worker 2 on the basis of the worker 1 velocity (VW1) and the worker 2 velocity (VW2).

Figure 37:
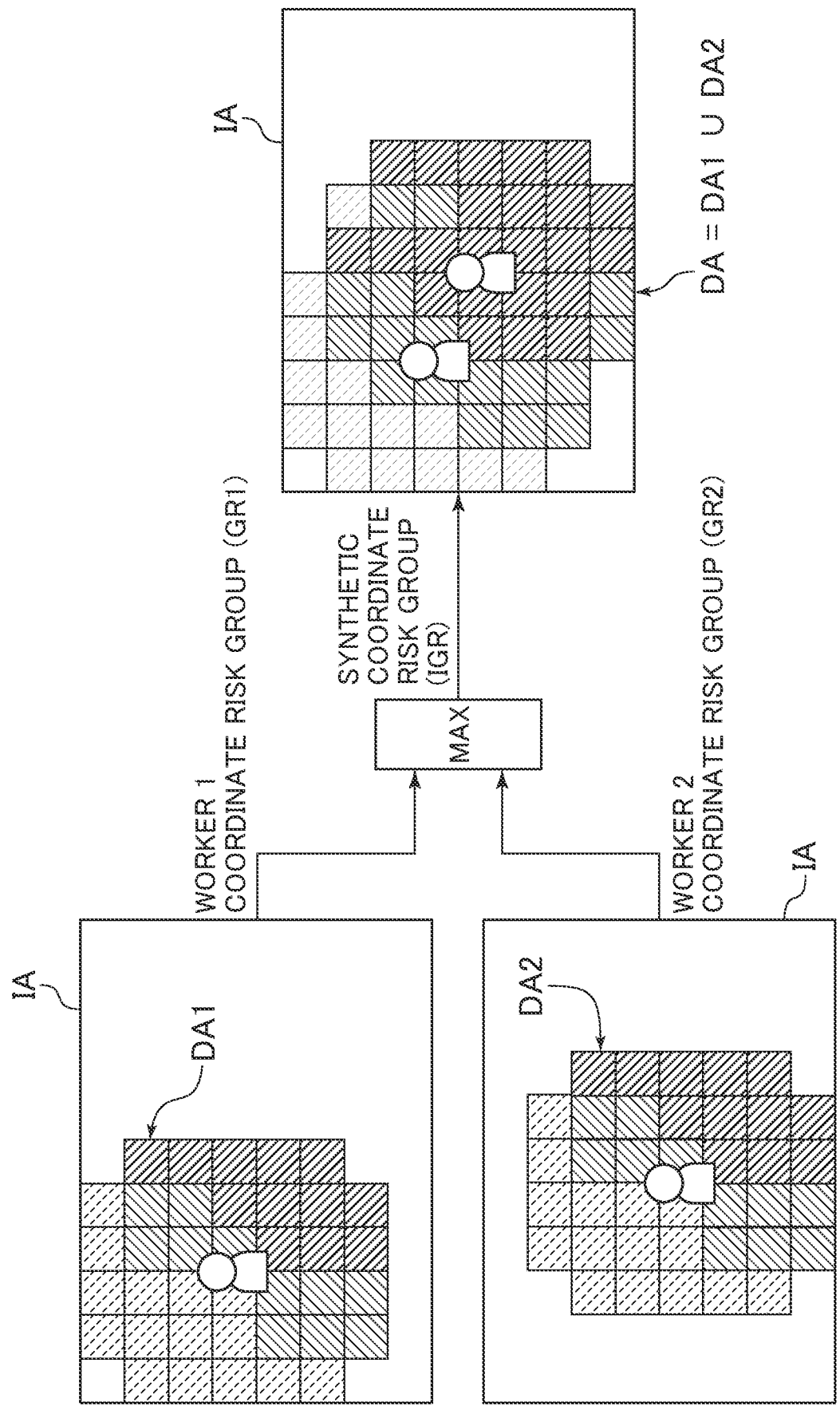
FIG. 37 is a view depicting processing functions of a risk synthesis section according to the second embodiment.

FIG. 37 is a view depicting processing functions of the risk synthesis section according to the present embodiment.

As depicted in FIG. 37, the risk synthesis section 10f6 synthesizes the worker 1 coordinate risk group (GR1) and the worker 2 coordinate risk group (GR2) computed for the computation area 1 (DA1) and the computation area 2 (DA2) for the worker 1 and the worker 2, respectively, and outputs them as a synthetic coordinate risk group (IGR) to the risk display device 9. The risk synthesis section 10f6 computes the synthetic coordinate risk group (IGR) by selecting a risk that indicates the highest value for each of the cells of the same coordinates in the worker 1 coordinate risk group (GR1) and the worker 2 coordinate risk group (GR2). In other words, the display area of the synthetic coordinate risk group (IGR) is represented by (DA1∪DA2)∩IA, and the risks of the plurality of workers are synthesized and displayed on the risk display device 9.

Figure 38:
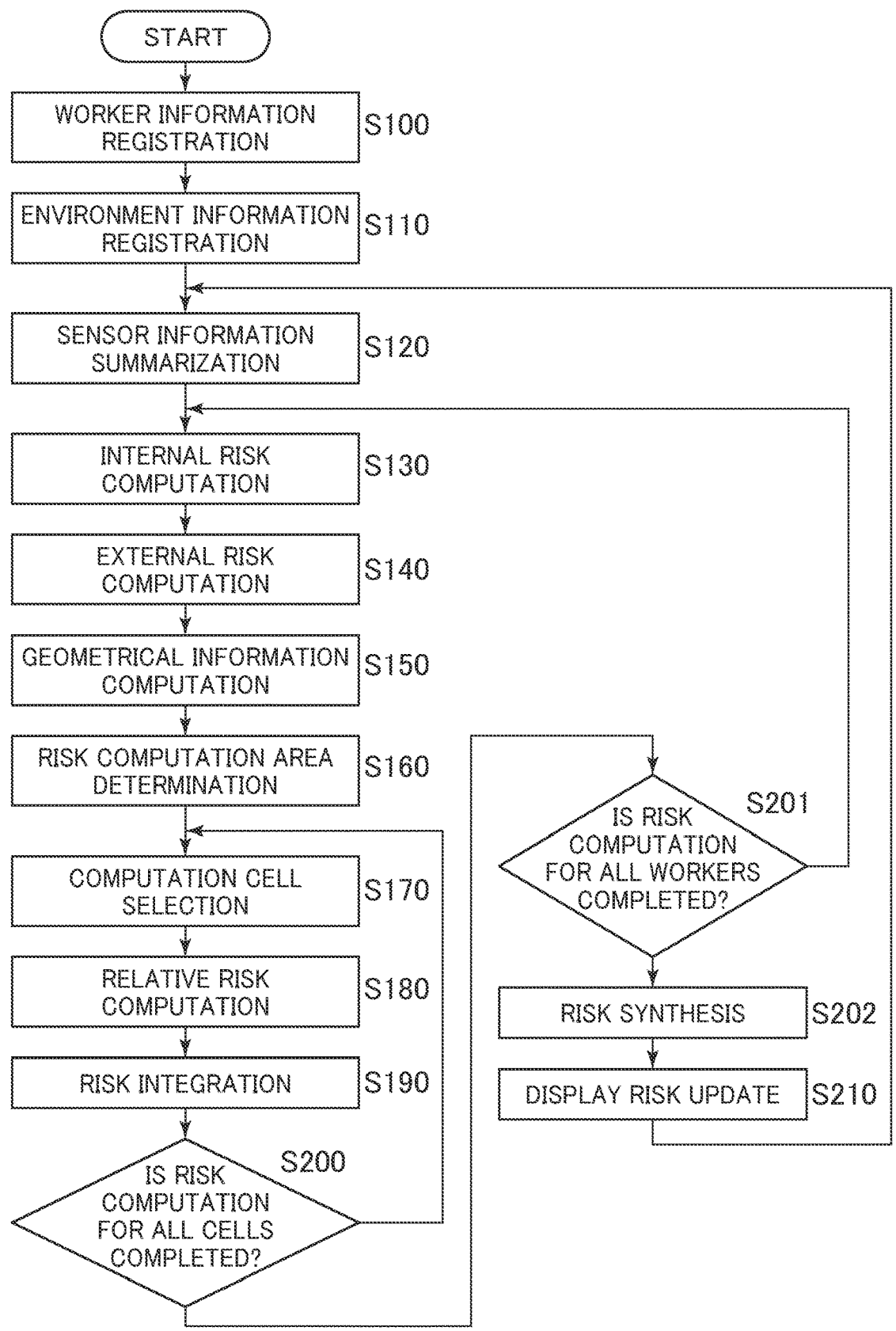
FIG. 38 is a flow chart illustrating the substance of processing of a risk computation process in the construction management system according to the second embodiment.

FIG. 38 is a flow chart depicting the substance of processing of the risk computation process by the construction management system according to the present embodiment.

Referring to FIG. 38, in the risk computation process, first as an initial process for starting periodic processing, a pre-process for registering worker information through the worker information registration device 2 is performed (step S100), and another pre-process for registering environment information for displaying a risk through the environment information registration device 1 is performed (step S110). In particular, in step S100, personal information on the worker 1, worker 2, and machine operator is inputted through the worker information registration device 2. Further, in step S110, a display area (IA) for computing and displaying a risk is inputted through the environment information registration device 1.

In the construction management device 10, in a state in which the initial processes are completed, information on the measuring devices 3 to 8 installed on the worker 1, worker 2, and work machine (100) is summarized into the internal information acquisition section 10a and the external information acquisition section 10b (step S120), and the internal risk computation section 10c computes an internal risk group 1 (IR_1) and an internal risk group 2 (IR_2) at the present point of time for each of the worker 1 and the worker 2 on the basis of the information summarized by the internal information acquisition section 10a (step S130). Further, the external risk computation section 10d computes an external risk group (ER) at the present point of time on the basis of the information summarized by the external information acquisition section 10b (step S140).

Further, the geometrical information computation section 10e computes a computation area 1 (CA1) and a computation area 2 (CA2) for computing a risk, a reference point position group (RP) of the machine at the present point of time, and a reference point velocity group (RV) for each of the worker 1 and the worker 2 on the basis of the geometrical information relating to the worker 1 and the worker 2 summarized by the internal information acquisition section 10a and the geometrical information relating to the work machine (hydraulic excavator 100) summarized by the external information acquisition section 10b (step S150).

Then, the computation area discretization section 10f1 of the risk integration section 10f determines discretization areas (DA1 and DA2), which are risk computation areas at the present point of time, for each of the worker 1 and the worker 2 on the basis of the display area (IA), computation area 1 (CA1), and computation area 2 (CA2).

Then, the risk computation coordinate determination section 10f2 selects one cell (Zi) for which computation is not completed from among N cells (Zi) (i=1 to N: positive integer) that configure the discretization areas (DA1 and DA2) for one of the worker 1 and the worker 2 as a cell for which computation is to be performed (step S170), and for the selected computation cell (Zi), the relative distance risk computation section 10f3 computes a relative risk 1 (RR1) relating to the relative distance and the relative velocity risk computation section 10f4 computes a relative risk 2 (RR2) relating to the relative velocity (step S180).

Then, the integration risk computation section 10f5 computes a coordinate risk (GR1) at the cell (Zi) using the evaluation model on the basis of the relative risk 1 (RR1) computed by the relative distance risk computation section 10f3, relative risk 2 (RR2) computed by the relative velocity risk computation section 10f4, internal risk group (IR_1) or internal risk group 2 (IR_2) computed by the internal risk computation section 10c, and external risk group (ER) computed by the external risk computation section 10d (step S190).

Here, it is decided whether or not the computation for all cells (Zi) (i=1 to N) is completed (step S200), and when the decision result is NO, the processes in steps S170 to S190 are repeated until the decision result becomes YES, that is, until the process for all cells (Zi) is completed.

On the other hand, when the decision result in step S200 is YES, that is, when the computation for all cells (Zi) configuring the discretization area (DA) is completed, it is decided subsequently whether or not the risk computation for all workers is completed (step S201). When the decision result in step S201 is NO, that is, when a worker for whom the risk computation is not performed as yet remains, the processing returns to step S130 and the processes in steps S130 to S190 are performed for another worker for whom the risk computation is not performed as yet.

On the other hand, when the decision result in step S201 is YES, that is, when the risk computation is completed for all workers (here, the worker 1 and the worker 2), the risk synthesis section 10f6 synthesizes the coordinate risk groups computed for each worker (here, worker 1 coordinate risk group (GR1) and worker 2 coordinate risk group (GR2)) to calculate a synthetic coordinate risk group (IGR) (step S202) and updates the information on the synthetic coordinate risk group (IGR), which is to be outputted to the risk display device 9, to update the risk display image to be displayed on the risk display device 9 (step S210). Thereafter, the processing returns to the process in step S120 and the risk computation process at the next point of time is performed.

In the construction management device 10, since the processes in steps S120 to S210 are repeated according to the computation cycle, also the risk display image on the risk display device 9, which is the computation result, is updated according to the computation cycle.

The configuration of the other part is similar to that of the first embodiment.

Also with the present embodiment configured in such a manner as described above, advantageous effects similar to those by the first embodiment can be achieved.

Further, since maximum values of risks computed in regard to a plurality of workers at a work site are synthesized into one map, while display missing of significant information relating to occurrence of an accident is suppressed to the minimum, the risks to the plurality of workers can be displayed by a single map, and the manager can grasp risk evaluation simply and conveniently.

It is to be noted that, although the present embodiment is described exemplifying a case in which the coordinate risk groups (GR1 and GR2) computed for each of the two workers of the worker 1 and the worker 2 are synthesized to calculate a synthetic coordinate risk group (IGR), this similarly applies also to a case in which synthetic coordinate risk groups (IGR) are calculated in regard to three or more workers. That is, by applying such a configuration that, when coordinate risk groups computed for each of a plurality of workers are to be synthesized, a maximum value of the coordinate risk group is taken for each cell and such maximum values are synthesized into one map, a synthetic coordinate risk group (IGR) in regard to three or more workers can be calculated.

Third Embodiment

A third embodiment of the present invention is described with reference to FIGS. 39 to 43.

In the present embodiment, an evaluation value of a risk is attenuated according to the distance from the current position of a worker.

Figure 39:
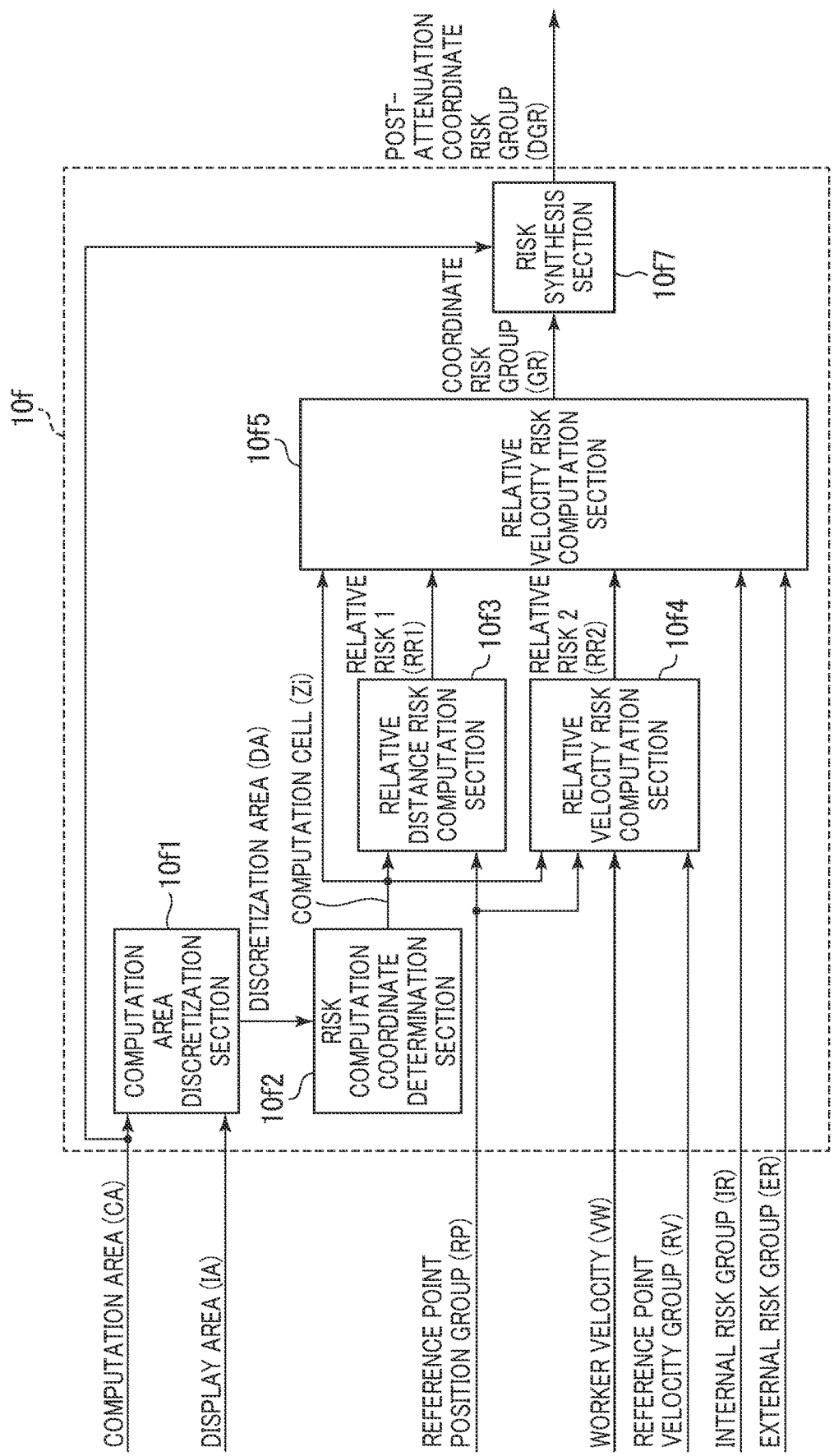
FIG. 39 is a functional block diagram depicting processing functions of a risk integration section according to a third embodiment.

FIG. 39 is a functional block diagram depicting processing functions of the risk synthesis section according to the present embodiment. In FIG. 39, like elements to those of the first embodiment are denoted by like reference characters and overlapping description of them is omitted.

Referring to FIG. 39, the risk integration section 10f includes, as functioning sections for computing a post-attenuation coordinate risk group (DGR), a computation area discretization section 10f1, a risk computation coordinate determination section 10f2, a relative distance risk computation section 10f3, a relative velocity risk computation section 10f4, an integration risk computation section 10f5, and a risk attenuation section 10f7.

FIGS. 40 to 43 are views depicting processing functions of the risk attenuation section.

Figure 40:
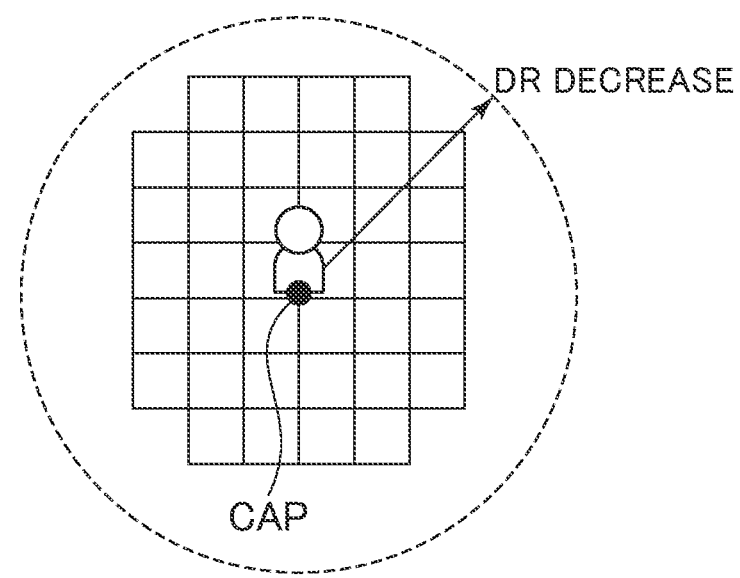
FIG. 40 is a view depicting a processing function of a risk attenuation section.

As depicted in FIG. 40, the risk attenuation section 10f7 computes an attenuation coefficient DR with which the attenuation ratio of a risk at a cell increases as the distance of the cell from the center position (CAP) of the computation area group (CA) (current position XW of the worker) increases. For example, the attenuation coefficient (DRi) of the ith coordinate risk (GRi) is computed in accordance with the (expression 29) given below.

$$DRi = c_D e^{\lambda D(|CAP-GRPi|)} \quad \text{(expression 29)}$$

Here, in the (expression 29) above, CD is a coefficient that defines a maximum value of the attenuation coefficient (DRi) and is equal to or higher than 0 (zero) and equal to or lower than 1, and λD is a coefficient for adjusting the degree of increase or decrease in the attenuation coefficient (DR) in response to increase or decrease in the reciprocal of the absolute value of the difference between the coordinates (GRPi) of the risk (GRi) and the center position (CAP) of the computation area (CA).

Figure 41:
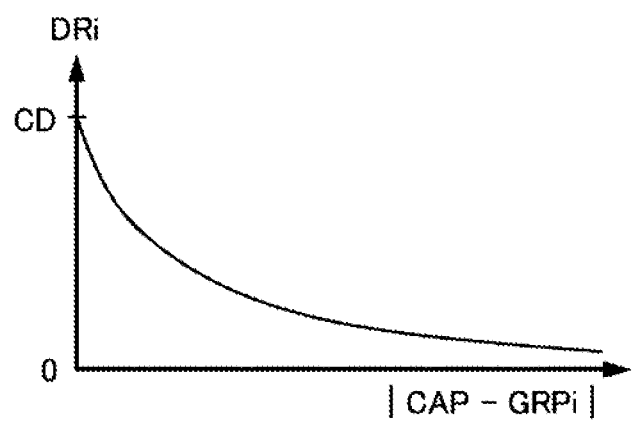
FIG. 41 is a view depicting another processing function of the risk attenuation section.

FIG. 41 is a graph of the computation of the attenuation coefficient (DRi) in accordance with the (expression 29) above. As depicted in FIG. 41, the attenuation coefficient (DRi) approaches its maximum value 1 as the absolute value of the difference between the risk coordinates GRPi and the center position CAP decreases and approaches its minimum value 0 (zero) as the absolute value of the difference between the risk coordinates GRPi and the center position CAP increases.

Figure 42:
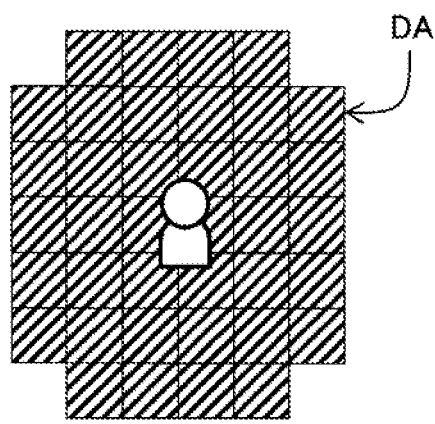
FIG. 42 is a view depicting a further processing function of the risk attenuation section.
Figure 43:
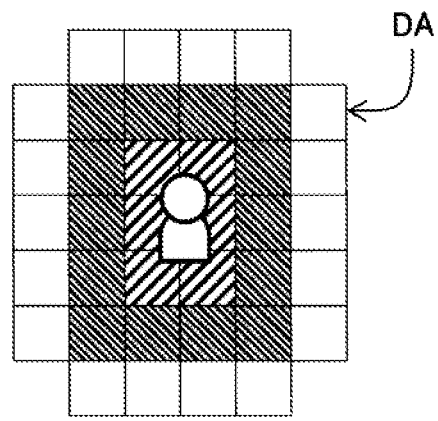
FIG. 43 is a view depicting a still further processing function of the risk attenuation section.

FIGS. 42 and 43 are views depicting examples of risk computation results in a case where the attenuation coefficient (DR) is not taken into consideration and another case where the attenuation coefficient (DR) is taken into consideration, respectively. It is to be noted that, in FIGS. 42 and 3, a case is considered in which the coordinate risk (GR) in the discretization area (DA) is fixed for simplification of the description.

Since the case in which the coordinate risk (GR) in the discretization area (DA) is fixed is considered, in a case where the attenuation coefficient (DR) is not taken into consideration as depicted in FIG. 42, the risk display results are the same in regard to all cells.

On the other hand, in the case where the coordinate risk (GR) is attenuated taking the attenuation coefficient (DR) into consideration, the post-attenuation coordinate risk group (DGR)=(DGRP, DGRD) is computed on the basis of the (expression 30) and the (expression 31) given below.

[Expression 30]

$$DGRPi = GRPi \quad \text{(expression 30)}$$

[Expression 31]

$$DGRDi = DRi \times GRDi \quad \text{(expression 31)}$$

As indicated by the (expression 30) and the (expression 31) above, the magnitude (DGRDi) of the post-attenuation worker risk is computed such that, at the coordinates (GRPi), which is the same as those of the coordinate risk (GRi), the magnitude (GRDi) of the worker risk is attenuated with the attenuation coefficient (DRi) for the ith cell. This process is performed for all cells in the discretization area (DA).

The configuration of the other part is similar to that in the first embodiment.

Also the present embodiment configured in such a manner as described above can achieve advantageous effects similar to those by the first embodiment.

Further, since it is possible to prevent evaluation being made such that a risk at a point remote from the current position of the worker is excessively high, while risks in a wide range are displayed, risks at the present point of time can be displayed with a higher degree of accuracy.

Fourth Embodiment

A fourth embodiment of the present invention is described with reference to FIGS. 44 to 47.

In the present embodiment, a computation area (CA) is determined on the basis of a worker velocity (VW) in addition to a worker position (XW).

Figure 44:
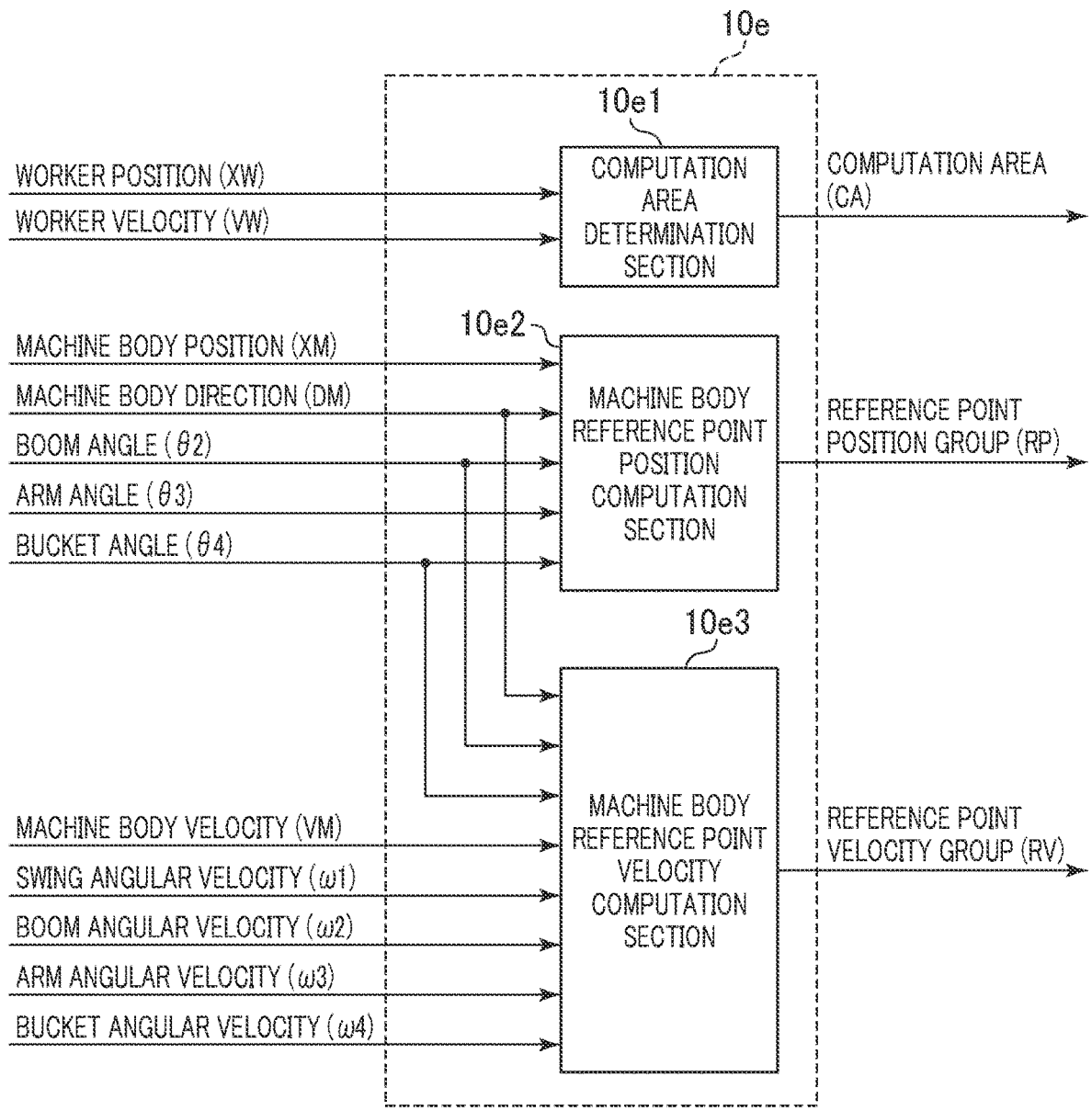
FIG. 44 is a functional block diagram depicting processing functions of a geometrical information computation section according to a fourth embodiment.
Figure 45:
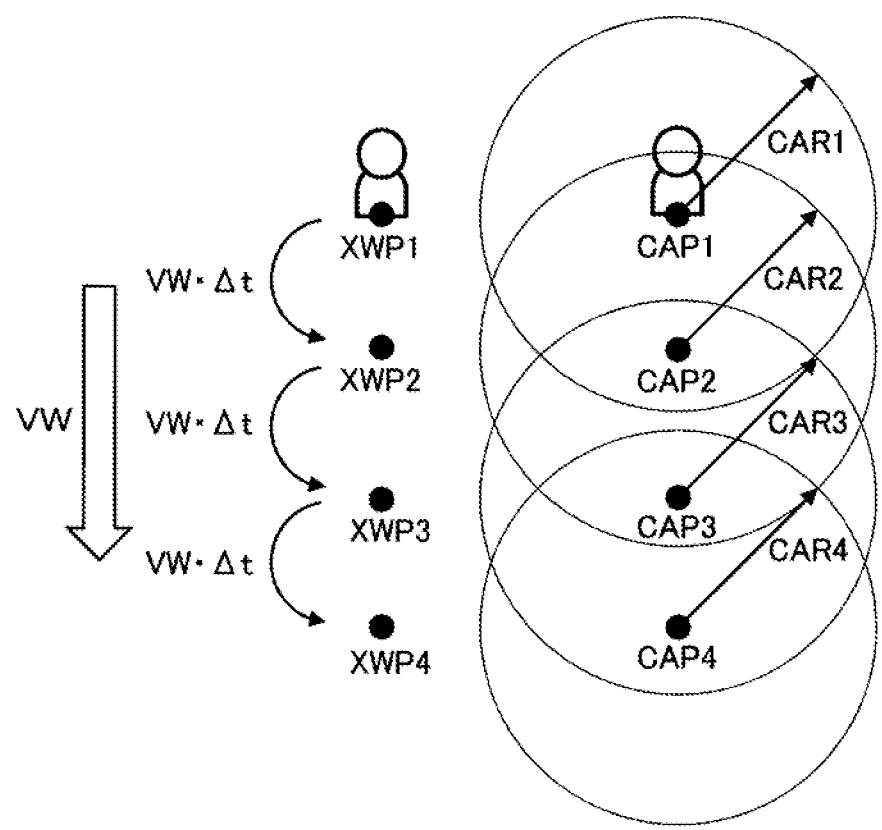
FIG. 45 is a view illustrating a computation principle of a worker position.

FIG. 44 is a functional block diagram depicting processing functions of a geometrical information computation section according to the present embodiment. FIG. 45 is a view illustrating a computation principle of a worker position. In FIGS. 44 and 45, like members to those in the first embodiment are denoted by like reference characters and overlapping description of them is omitted.

Referring to FIG. 44, the geometrical information computation section 10e includes, as functioning sections for computing geometrical information, a computation area computation section 10e1, a machine body reference point position computation section 10e2, and a machine body reference point velocity computation section 10e3. The geometrical information computation section 10e computes a computation area (CA), a reference point position group (RP), and a reference point velocity group (RV) on the basis of various kinds of information inputted thereto and outputs them to the risk integration section 10f.

The computation area computation section 10e1 computes a computation area (CA) for risks on the basis of the worker position (XW) and the worker velocity (VW). As depicted in FIG. 45, a predicted worker position (XWP) after Δt seconds is sequentially computed on the basis of the worker velocity (VW). When a predicted worker position (XWP1) at a certain point of time is given, (XWP2) that is a predicted position at a next point of time is calculated in accordance with the (expression 32) given below.

[Expression 32]

$$XWP2 = XWP1 + VW \cdot \Delta t \quad \text{(expression 32)}$$

The computation of the predicted position (XWP) is performed sequentially by the number of times (T) determined in advance. Accordingly, the predicted worker position group (XWP) is represented as XWP=(XWP1, XWP2, ..., XWPT). Accordingly, the computation area group (CA) is calculated in accordance with the (expression 33) and the (expression 34) on the basis of the predicted worker position group (XWP).

[Expression 33]

$$CAPt = XWPt \quad \text{(expression 33)}$$

[Expression 34]

$$CARt = CAR \quad \text{(expression 34)}$$

Here, in the (expression 33) and the (expression 34) above, t is a number indicative of the computation area (CA) at the applicable prediction time point, and the maximum value of t coincides with the prediction time number (T). In other words, the (expression 33) above signifies that the center position (CAPt) of the tth computation area (CAt) coincides with the tth predicted worker position (SWPt). On the other hand, the (expression 34) signifies that the radius (CARt) of the tth computation area (CAt) always has a fixed value (CAR). In the present embodiment configured in such a manner as described above, it is possible to compute risks in a wider range as the prediction time number (T) increases, and it is possible to display risks such that an accident is prevented before it happens.

Figure 46:
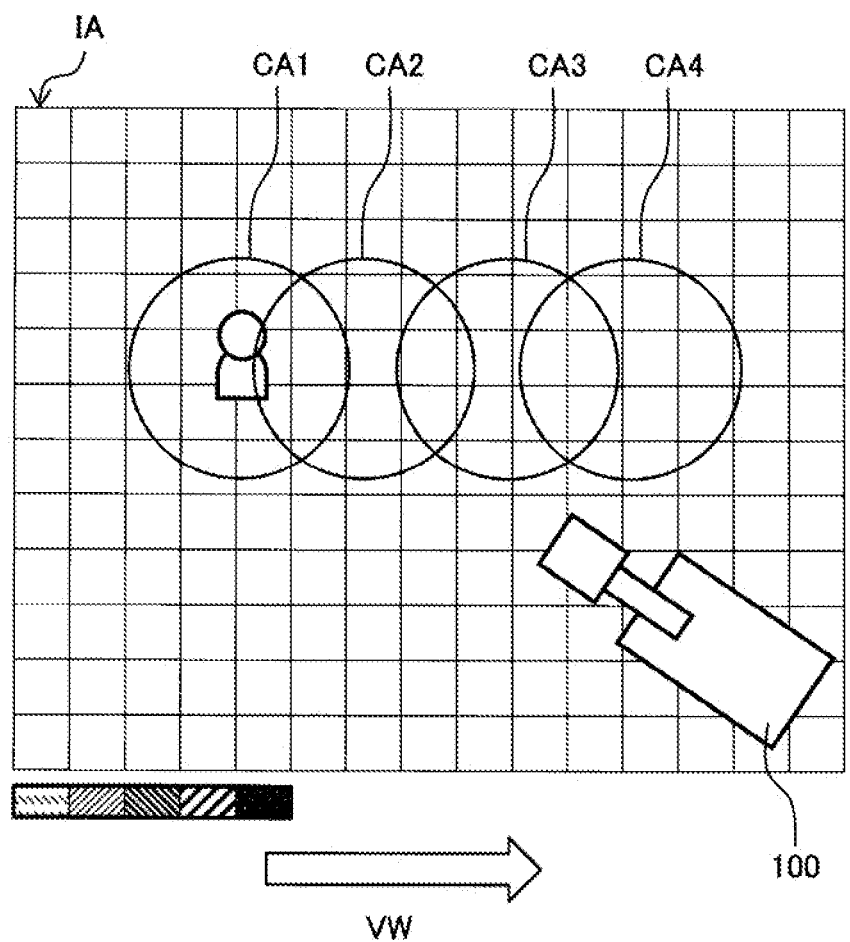
FIG. 46 is a view depicting an example of a risk display image according to the fourth embodiment.
Figure 47:
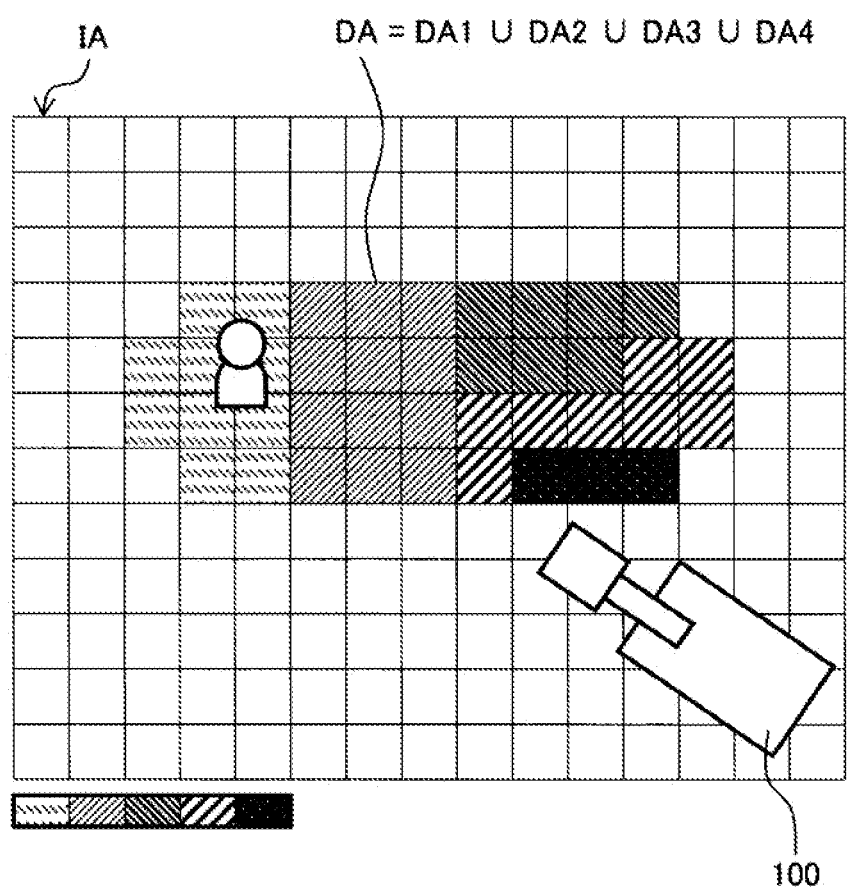
FIG. 47 is a view depicting another example of a risk display image according to the fourth embodiment.

FIGS. 46 and 47 are views depicting an example of a risk display image according to the present embodiment.

In FIG. 46, a result when a computation area group (CA) is projected to the display area 1A on the risk display device 9 is depicted. In the present embodiment, it is assumed that the worker moves at a velocity (VW) in a direction close to the hydraulic excavator 100 and four computation areas (CA1) to (CA4) are calculated. The calculated computation area group (CA) is inputted to the computation area discretization section 10/1 and then outputted as a discretization area (DA) to the risk computation coordinate determination section 10/2. At this time, the discretization area (DA) is represented by DA=DA1∪DA2∪DA3∪DA4 as depicted in FIG. 47.

The configuration of the other part is similar to that in the first embodiment.

Also with the present embodiment configured in such a manner as described above, advantageous effects similar to those by the first embodiment can be achieved.

Further, particularly in a case in which the worker is operating in a direction close to the machine, the risks to the worker can be detected and displayed before they happen.

Fifth Embodiment

A fifth embodiment of the present invention is described with reference to FIGS. 48 to 50.

In the present embodiment, in a case in which the number of workers on the side that suffers a risk is a plural number (for example, three including a worker 1, a worker 2, and a worker 3) and the number of work machines on the side that provides a risk is one (hydraulic excavator 100), a coordinate risk group (GR) of part or all of the workers is optionally selected from among a plurality of coordinate risk groups (GR) calculated for each of the plurality of workers, and such coordinate risk groups (GR) are synthesized to calculate a synthetic coordinate risk group (IGR).

Figure 48:
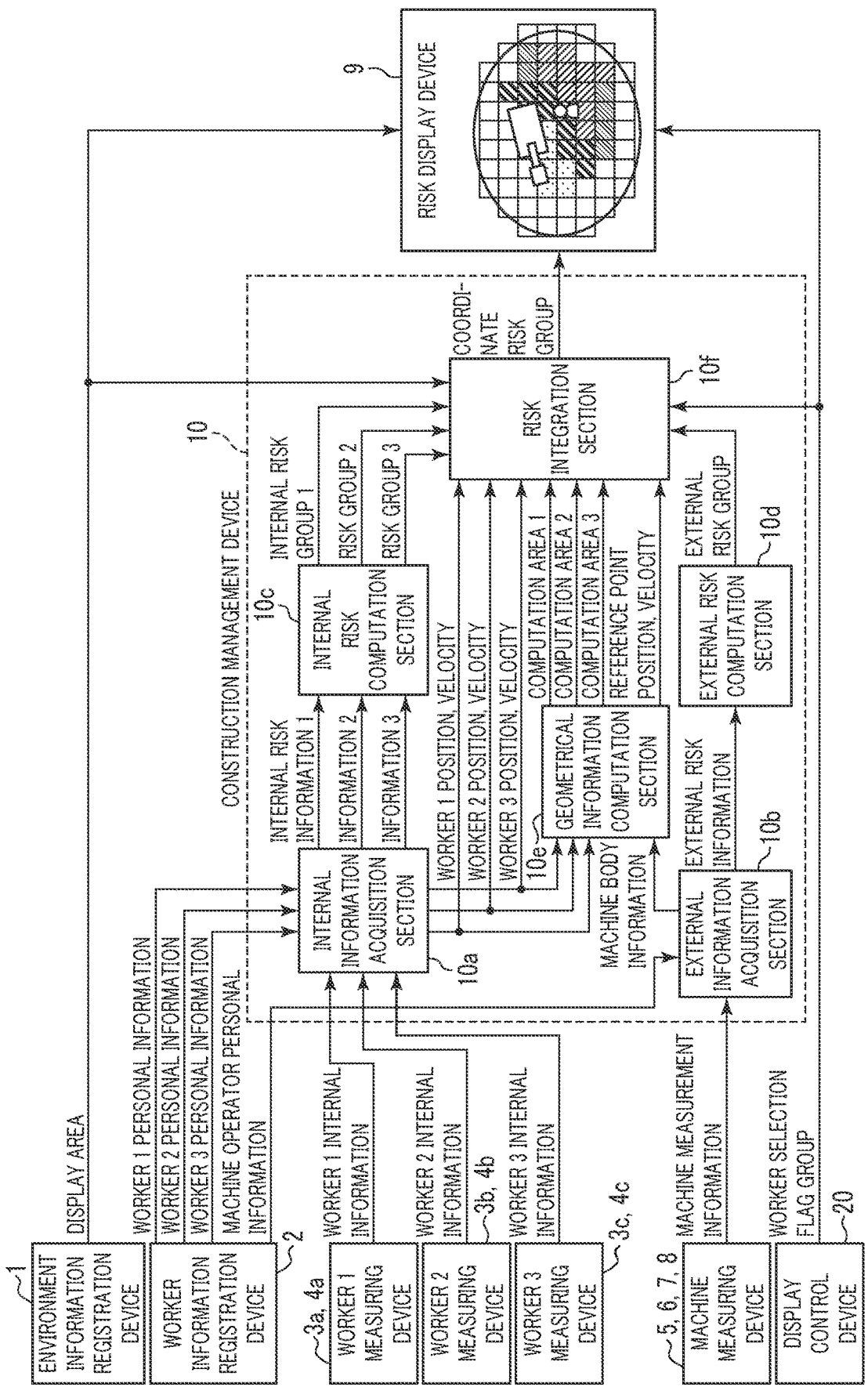
FIG. 48 is a functional block diagram depicting processing functions of a construction management system according to a fifth embodiment.

FIG. 48 is a functional block diagram depicting processing functions of the construction management system according to the present embodiment. Further, FIG. 49 is a functional block diagram depicting processing functions of the risk combining section according to the present embodiment. In FIGS. 48 and 49, like members to those in the second embodiment are denoted by like reference characters and overlapping description of them is omitted.

Referring to FIG. 48, the construction management system is configured from an environment information registration device 1, a worker information registration device 2, worker 1 measuring devices (worker position measuring device 3a and worker biometric information measuring device 4a), worker 2 measuring devices (worker position measuring device 3b and worker biometric information measuring device 4b), worker 3 measuring devices (worker position measuring device 3c and worker biometric information measuring device 4c), machine measuring devices (machine body position measuring device 5, machine body posture measuring device 6, machine front implement posture measuring device 7, and machine operator biometric information measuring device 8), a risk display device 9, a construction management device 10, and a display controller 20.

In the worker information registration device 2, personal information on the workers (worker 1, worker 2, and worker 3) who work at a construction site and the operator of the work machine (hydraulic excavator 100) is registered.

The worker position measuring devices 3a, 3b, and 3c measure the position information and the velocity of the worker 1, worker 2, and worker 3, respectively, and are provided for the worker 1, worker 2, and worker 3, respectively.

The worker biometric information measuring devices 4a, 4b, and 4c measure biometric information on the worker 1, worker 2, and worker 3, respectively, and are provided for the worker 1, worker 2, and worker 3, respectively.

The display controller 20 can input a worker selection flag group as an event input. The worker selection flag group is a set of flags by which a worker who is selected is indicated by "1" and a worker who is not selected is indicated by "0" (zero).

Figure 49:
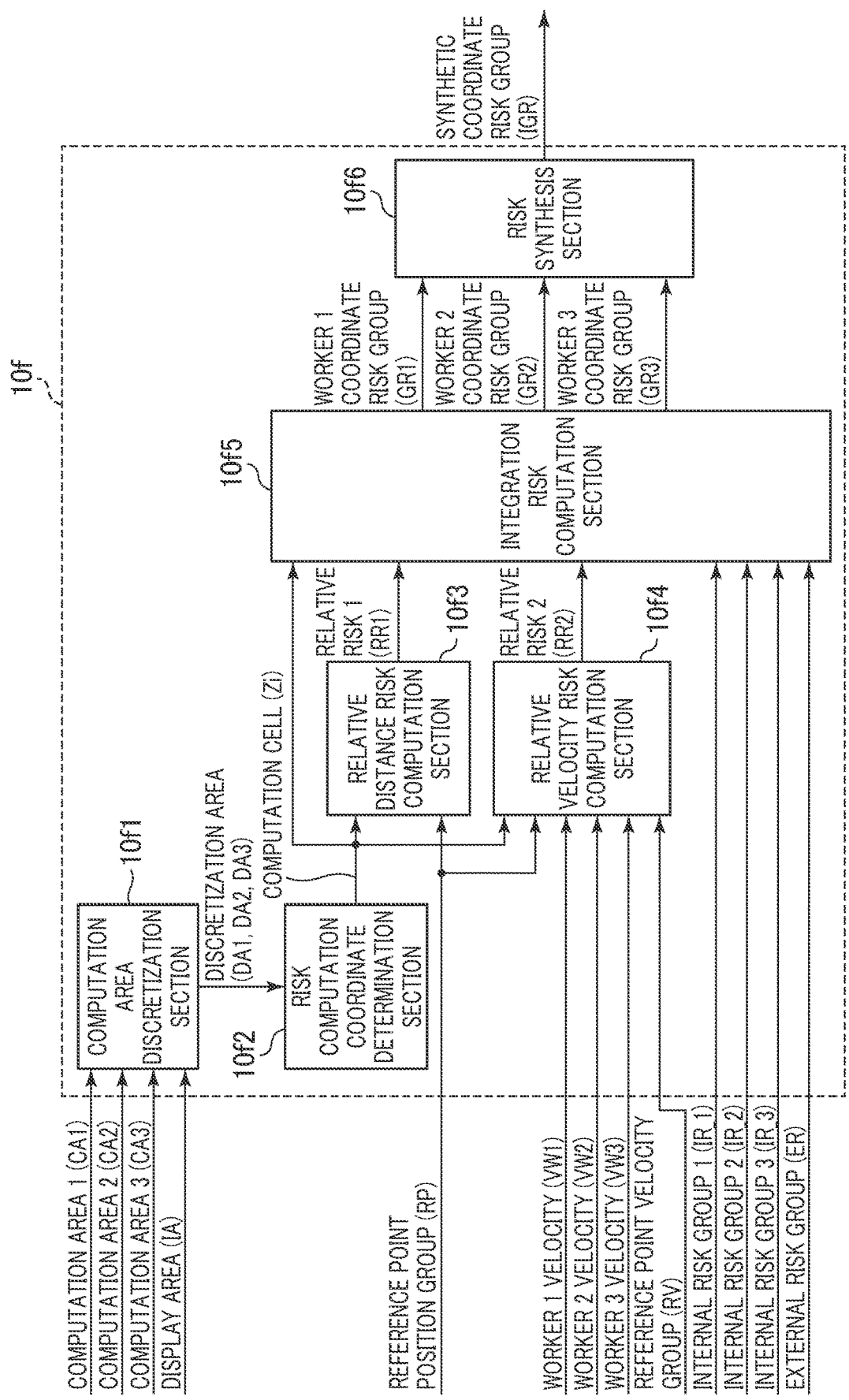
FIG. 49 is a functional block diagram depicting processing functions of a risk integration section according to the fifth embodiment.

Referring to FIG. 49, the risk integration section 10f includes, as functioning sections for calculating a synthetic coordinate risk group (IGR), a computation area discretization section 10/1, a risk computation coordinate determination section 10/2, a relative distance risk computation section 10/3, a relative velocity risk computation section 10/4, an integration risk computation section 10/5, and a risk synthesis section 10/6. The risk integration section 10f computes coordinate risk groups (GR1, GR2, and GR3) on the basis of various kinds of information inputted thereto, synthesizes them to compute a synthetic coordinate risk group (IGR), and outputs the synthetic coordinate risk group (IGR) to the risk display device 9.

The computation area discretization section 10/1 computes a discretization area 1 (DA1), a discretization area 2 (DA2), and a discretization area (DA3) for each of the worker 1, worker 2, and worker 3 on the basis of the computation area 1 (CA1), computation area 2 (CA2), computation area (CA3), and display area (IA), and outputs them to the risk computation coordinate determination section 10/2.

The relative distance risk computation section 10/3 calculates a relative risk 1 (RR1) for each of the discretization area 1 (DA1), discretization area 2 (DA2), and discretization area (DA3).

The relative velocity risk computation section 10/4 calculates a relative risk 2 (RR2) for each of the worker 1, worker 2, and worker 3 on the basis of the worker 1 velocity (VW1), worker 2 velocity (VW2), and worker 3 velocity (VW3).

FIG. 50 is a view depicting processing functions of the risk synthesis section according to the present embodiment.

As depicted in FIG. 50, the risk synthesis section 10/6 synthesizes only selected ones of the worker 1 coordinate risk group (GR1), worker 2 coordinate risk group (GR2), and worker 3 coordinate risk group (GR3), which are computed in the computation area 1 (DA1), computation area 2 (DA2), and computation area (DA3) for the worker 1, worker 2, and worker 3, respectively. In this case, the coordinate worker groups to be synthesized are selected according to the worker selection flag group inputted from the display controller 20. Then, the risk synthesis section 10/6 outputs them as a synthetic coordinate risk group (IGR) to the risk display device 9.

For the risk synthesis section 10/6, the number of computation controllers corresponding to the number of workers are provided. Each of the computation controllers controls whether or not a coordinate risk group (GR) of the applicable worker is to be outputted to the following stage side according to the corresponding worker selection flag. In the present embodiment, a case is exemplified in which the coordinate risk (GR1 and GR2) of the worker 1 and worker 2 from among the supposed three workers are outputted to the following stage side while the coordinate risk (GR3) of the worker 3 is not outputted to the following stage side such that risk display is performed only for the worker 1 and the worker 2. At this time, the worker 1 selection flag inputted to the computation controller 1 and the worker 2 selection flag inputted to the computation controller 2 are "1" and the worker 3 selection flag inputted to the computation controller 3 is "0" (zero). In this case, only the worker 1 coordinate risk group (GR1) and the worker 2 coordinate risk group (GR2) are outputted to and synthesized by the following stage side and then outputted to the risk display device 9. In short, the display area (DA) of the synthetic coordinate risk group (IGR) displayed on the risk display device 9 is DA=DA1∪DA2.

The configuration of the other part is similar to that in the first embodiment.

Also with the present embodiment configured in such a manner as described above, advantageous effects similar to those by the first embodiment can be achieved.

Further, since a worker who becomes a display target of a worker risk to be displayed on the risk display device 9 can be changed optionally by selection by the manager, the manager can easily specify a risk factor in a case where the risk becomes high.

In the following, features of the embodiments described above are described.

(1) In the embodiments described above, the construction management system includes a worker measuring device (for example, the worker position measuring device 3, 3a, 3b, 3c, and the worker biometric information measuring device 4, 4a, 4b, 4c) for measuring a state of a worker, a machine measuring device (for example, the machine body position measuring device 5, machine body posture measuring device 6, machine front implement posture measuring device 7, and machine operator biometric information measuring device 8) for measuring a state of a work machine (for example, the hydraulic excavator 100), a worker information registration device 2 that registers personal information on the worker and an operator who operates the work machine, an environment information registration device 1 that registers information on a construction environment to be made a target, and a construction management device 10 that computes, on the basis of information relating at least to a position of the worker measured by the worker measuring device, information relating at least to a position of the work machine measured by the machine measuring device, personal information on the worker and the operator, the personal information being registered in the worker information registration device, and information on the construction environment from the environment information registration device, a risk that indicates a degree of danger with which an accident occurs, and outputs the computed risk as a coordinate risk associated with a coordinate of the construction environment to a risk display device 9 such that the risk is displayed in a map format on the risk display device.

By such a configuration as described above, a risk in the construction site can be evaluated in a higher degree of accuracy, and an evaluation result can be presented in an enhanced appropriate form.

(2) Further, in the embodiments described above, the construction management system of (1) is configured such that the construction management device 10 computes, on the basis of the information on the worker that is a side suffering the risk, an internal risk arising from a state of the side that suffers the risk, computes, on the basis of the information on the work machine (for example, hydraulic excavator 100) that is a side providing the risk and on the operator, an external risk arising from a state of the side that provides the risk, and integrates the internal risk, the external risk, and geometrical information on the worker and the work machine to compute the coordinate risk.

(3) Further, in the embodiments described above, the construction management system of (1) is configured such that the construction management device 10 computes, on the basis of information on each of the plurality of workers, personal information on each of the plurality of workers, personal information on the operator, and information on the construction environment, a coordinate risk in regard to each of the plurality of workers, and outputs a result where a plurality of the coordinate risks associated with the same coordinate are synthesized so as to take a maximum value of the coordinate risks to the risk display device 9 such that the result is displayed in a map format on the risk display device 9.

(4) Further, in the embodiments described above, the construction management system of (1) is configured such that the construction management device 10 computes the coordinate risk so as to be lower at coordinates that are remoter from the position of the worker.

(5) Further, in the embodiments described above, the construction management system of (1) is configured such that the construction management device 10 expands a computation range for the coordinate risk in a direction in which the worker moves.

(6) Further, in the embodiments described above, the construction management system of (1) is configured such that the construction management device 10 synthesizes the coordinate risks so as to take a maximum value of the coordinate risks associated with the same coordinates only in regard to a worker selected in advance from among a plurality of the workers, and outputs a result of the synthesis to the risk display device such that the result of the synthesis is displayed in a map format on the risk display device.

(7) Further, in the embodiments described above, the construction management system of (1) is configured such that the work measuring device includes a worker position measuring device 3, 3a, 3b, 3c for measuring information relating to the position of the worker and a worker biometric information measuring device 4, 4a, 4b, 4c for measuring biometric information on the worker, and the construction management device 10 computes the risk further on the basis of the biometric information on the worker measured by the worker biometric information measuring device 4, 4a, 4b, 4c.

(8) Further, in the embodiments described above, a work machine includes a lower track structure 103, an upper swing structure 102 swingably provided with respect to the lower track body, an articulated front work implement 101 attached to the upper swing body and including a plurality of driven members (for example, the boom 104, arm 105, and bucket (work implement) 106) pivotably connected to each other, a machine measuring device (for example, the machine body position measuring device 5, machine body posture measuring device 6, machine front implement posture measuring device 7, and machine operator biometric information measuring device 8) for measuring the upper swing body and the front work implement and a state of the upper swing body, and a construction management device 10 that computes, on the basis of information relating at least to a position of a worker measured by a worker measuring device (for example, the worker position measuring device 3, 3a, 3b, 3c, and worker biometric information measuring device 4, 4a, 4b, 4c) for measuring a state of the worker, information relating at least to a position of a work machine (for example, the hydraulic excavator 100) measured by the machine measuring device, personal information registered in advance on the worker and an operator who operates the work machine, and information on a construction environment, and outputs the computed risk as a coordinate risk associated with a coordinate of the construction environment to a risk display device 9 such that the risk is displayed in a map format on the risk display device.

<Appendix>

It is to be noted that the present invention is not limited to the embodiments described hereinabove and includes various modifications and combinations without departing from the subject matter of the invention. Further, the present invention is not limited to what includes all configurations described hereinabove in connection with the embodiments and includes what does not include part of the configurations. Further, the configurations, functions, and so forth described hereinabove may be implemented partly or entirely by designing them, for example, with an integrated circuit or the like. Further, the configurations, functions, and so forth described above may be implemented by software by a processor interpreting and executing a program for implementing each of the functions.

DESCRIPTION OF REFERENCE CHARACTERS

1: Environment information registration device
2: Worker information registration device
3, 3a to 3c: Worker position measuring device
4, 4a to 4c: Worker biometric information measuring device
5: Machine body position measuring device
6: Machine body posture measuring device
7: Machine front implement posture measuring device
8: Machine operator biometric information measuring device
9: Risk display device
10: Construction management device
10a: Internal information acquisition section
10b: External information acquisition section
10c: Internal risk computation section
10c1 to 10c3: Internal factor computation section
10d: External Risk computation section
10d1 to 10d4: External factor computation section
10e: Geometrical information computation section
10e1: Computation area computation section
10e2: Machine body reference point position computation section
10e3: Machine body reference point velocity computation section
10f: Risk integration section
10f1: Computation area discretization section
10f2: Risk computation coordinate determination section
10f3: Relative distance risk computation section
10f4: Relative velocity risk computation section
10f5: Integration risk computation section
10f6: Risk synthesis section
10f7: Risk attenuation section
20: Display controller
100: Hydraulic excavator
101: Front work implement
101a, 101b: Reception antenna (GNSS antenna)
102: Upper swing structure
102a, 104a to 106a: Inertial measurement unit (IMU)
103: Lower track structure
103a: Angle measurement unit
1104: Boom
105: Arm
106: Bucket
110: Operation room

The invention claimed is:

1. A construction management system, comprising:
a worker measuring device for measuring information relating at least to a position of a worker as a state of the worker;
and
a construction management device that is configured to compute, on the basis of information relating at least to a position of the worker measured by the worker measuring device, information relating at least to a position of the work machine measured by the machine measuring device, personal information on the worker and an operator who operates the work machine, and information on the construction environment a risk that indicates a degree of danger with which an accident occurs, and output the computed risk as a coordinate risk associated with a coordinate of the construction environment to a risk display device such that the risk is displayed in a map format on the risk display device.

2. The construction management system according to claim 1, wherein
the construction management device is configured to compute, on a basis of the information on the worker that is a side suffering the risk, an internal risk arising from a state of the side that suffers the risk, compute, on a basis of the information on the work machine that is a side providing the risk and on the operator, an external risk arising from a state of the side that provides the risk, and integrate the internal risk, the external risk, and geometrical information on the worker and the work machine to compute the coordinate risk.

3. The construction management system according to claim 1, wherein
the construction management device is configured to compute, in case that a plurality of workers exist, on a basis of information on each of a plurality of workers, personal information on each of the plurality of workers, personal information on the operator, and information on the construction environment, a coordinate risk in regard to each of the plurality of workers, and output a result where a plurality of the coordinate risks associated with a same coordinate are synthesized so as to take a maximum value of the coordinate risks to the risk display device such that the result is displayed in a map format on the risk display device.

4. The construction management system according to claim 1, wherein
the construction management device is configured to compute the coordinate risk so as to be lower at coordinates that are remoter from the position of the worker.

5. The construction management system according to claim 1, wherein
the construction management device is configured to expand a computation range for the coordinate risk in a direction in which the worker moves.

6. The construction management system according to claim 3, wherein
the construction management device is configured to synthesize the coordinate risks so as to take a maximum value of the coordinate risks associated with the same coordinate only in regard to a worker selected in advance from among a plurality of the workers, and output a result of the synthesis to the risk display device such that the result of the synthesis is displayed in a map format on the risk display device.

7. The construction management system according to claim 1, wherein
the worker measuring device includes a worker position measuring device for measuring information relating to the position of the worker and a worker biometric information measuring device for measuring biometric information on the worker, and
the construction management device is configured to compute the risk further on a basis of the biometric information on the worker measured by the worker biometric information measuring device.

8. A work machine, comprising:

a lower track structure;

an upper swing structure swingably provided with respect to the lower track body;

an articulated front work implement attached to the upper swing body and including a plurality of driven members pivotably connected to each other;

a machine measuring device for measuring the upper swing body and the front work implement and a state of the upper swing body; and a construction management device that is configured to compute, on a basis of information relating at least to a position of a worker measured by a worker measuring device for measuring information relating at least to the position of the worker as a state of the worker, information relating at least to a position of the work machine measured by the machine measuring device, personal information on the worker and an operator who operates the work machine, and information on a construction environment, a risk indicative of a degree of danger with which an accident occurs, and output the computed risk as a coordinate risk associated with a coordinate of the construction environment to a risk display device such that the risk is displayed in a map format on the risk display device.

* * * * *